(12) United States Patent
Collen et al.

(10) Patent No.: US 10,279,864 B2
(45) Date of Patent: May 7, 2019

(54) BICYCLE POWER METER

(71) Applicant: SRAM, LLC, Chicago, IL (US)

(72) Inventors: John Collen, San Luis Obispo, CA (US); Ryan Jennings, Spearfish, SD (US); John Eppen, Spearfish, SD (US); Owen Anders Britton, Spearfish, SD (US); Scott McLaughlin, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/875,642

(22) Filed: Jan. 19, 2018

(65) Prior Publication Data

US 2018/0141613 A1 May 24, 2018

Related U.S. Application Data

(63) Continuation-in-part of application No. 15/476,095, filed on Mar. 31, 2017, which is a continuation-in-part of application No. 15/097,021, filed on Apr. 12, 2016, now Pat. No. 9,784,628.

(51) Int. Cl.
| | |
|---|---|
| *G01L 3/00* | (2006.01) |
| *B62M 3/16* | (2006.01) |
| *B62J 99/00* | (2009.01) |
| *G01L 3/10* | (2006.01) |
| *B62L 1/00* | (2006.01) |

(52) U.S. Cl.
CPC ............... *B62M 3/16* (2013.01); *B62J 99/00* (2013.01); *G01L 3/108* (2013.01); *B62J 2099/002* (2013.01); *B62L 1/005* (2013.01)

(58) Field of Classification Search
CPC ...... B62L 1/005; B62J 2099/002; B62J 99/00; G01L 3/108; B62M 3/16
USPC .................................................... 73/862.338
See application file for complete search history.

(56) References Cited

U.S. PATENT DOCUMENTS

| | | | |
|---|---|---|---|
| 5,027,303 | A | 6/1991 | Witte |
| 5,560,266 | A | 10/1996 | Shikimori et al. |
| 5,894,094 | A | 4/1999 | Kuchler et al. |
| 5,900,703 | A | 5/1999 | Li |
| 6,038,933 | A | 3/2000 | Meyer |
| 6,173,801 | B1 | 1/2001 | Kakutani et al. |

(Continued)

FOREIGN PATENT DOCUMENTS

| | | |
|---|---|---|
| TW | I426251 B | 2/2014 |
| TW | I478844 B | 4/2015 |
| WO | 2011074947 A1 | 6/2011 |

*Primary Examiner* — Max H Noori

(57) ABSTRACT

A chainring structure may include a torque output section comprising a plurality of sprockets having two axially bounding sprockets defining an inner-most and outer-most sprocket and a torque input section configured to attach to a crank assembly. The chainring structure may also include a power meter chamber disposed radially between the torque input section and the torque output section, the power meter chamber including a base surface of a strain measurement section. The power meter may be disposed in the power meter chamber and have at least one strain measurement device attached to the base surface. The torque output section, torque input section, and power meter chamber may be formed as a unitary single piece and configured to dispose the base surface axially between the axially bounding sprockets of the plurality of sprockets.

17 Claims, 28 Drawing Sheets

(56) References Cited

U.S. PATENT DOCUMENTS

| | | |
|---|---|---|
| 6,418,797 B1 | 7/2002 | Ambrosina et al. |
| 6,447,421 B1 | 9/2002 | Wren |
| 6,487,932 B2 | 12/2002 | McIlraith |
| 6,557,657 B2 | 5/2003 | Persson |
| 6,935,157 B2 | 8/2005 | Miller |
| 7,024,948 B2 | 4/2006 | Eilersen |
| 7,047,817 B2 | 5/2006 | Lanham |
| 7,240,586 B2 | 7/2007 | Wu |
| 7,257,468 B1 | 8/2007 | Costa et al. |
| 7,975,561 B1 | 7/2011 | Ambrosina et al. |
| 8,505,393 B2 | 8/2013 | Meyer |
| 8,584,529 B2 | 11/2013 | Fisher et al. |
| 8,689,645 B2 | 4/2014 | Watarai |
| 8,800,389 B2 | 8/2014 | Tetsuka |
| 8,844,377 B2 | 9/2014 | Yap |
| 8,881,608 B2 | 11/2014 | Tetsuka et al. |
| 8,984,962 B2 | 3/2015 | Christmann |
| 9,182,304 B2 | 11/2015 | Namiki et al. |
| 9,784,628 B1 | 10/2017 | Jennings et al. |
| 2003/0073546 A1 | 4/2003 | Lassanske et al. |
| 2005/0132820 A1 | 6/2005 | Eilersen |
| 2005/0178210 A1 | 8/2005 | Lanham |
| 2006/0037409 A1 | 2/2006 | Ichige |
| 2006/0082090 A1 | 4/2006 | Constans |
| 2007/0042864 A1 | 2/2007 | Martin |
| 2009/0043534 A1 | 2/2009 | Prestidge et al. |
| 2009/0120210 A1 | 5/2009 | Phillips et al. |
| 2010/0263468 A1 | 10/2010 | Fisher et al. |
| 2011/0046831 A1* | 2/2011 | Ananthakrishna ....... B60K 6/12 701/22 |
| 2011/0116278 A1 | 5/2011 | Lin |
| 2012/0017701 A1 | 1/2012 | Meyer |
| 2012/0214646 A1 | 8/2012 | Lull et al. |
| 2012/0285264 A1 | 11/2012 | Sasaki |
| 2013/0049445 A1 | 2/2013 | Kitamura |
| 2013/0104650 A1* | 5/2013 | Bailey ..................... B62M 3/00 73/495 |
| 2013/0233092 A1 | 9/2013 | Tetsuka et al. |
| 2013/0233126 A1 | 9/2013 | Tetsuka |
| 2014/0000361 A1 | 1/2014 | Teixeira |
| 2014/0035356 A1* | 2/2014 | Watarai ..................... B60L 1/14 307/9.1 |
| 2014/0283622 A1 | 9/2014 | Namiki et al. |
| 2015/0082939 A1 | 3/2015 | Meyer et al. |
| 2015/0204695 A1 | 7/2015 | Huang |
| 2015/0228066 A1* | 8/2015 | Farb ................... G06K 9/00805 348/148 |
| 2016/0096493 A1 | 4/2016 | Suzuki et al. |

* cited by examiner

BICYCLE POWER METER

BACKGROUND OF THE INVENTION

A bicycle rider may desire information regarding the amount of power being input, output, or removed from the drive train of a bicycle during use. Power meters may be configured to detect and/or measure this power, and/or output or otherwise provide this amount of power. Bicycle power meters may use deformation or strain measurement devices, such as strain gauges, to measure deflection and/or deformation of a bicycle component during use to establish the amount of power. Traditionally the installation, positioning, and/or placement of these strain measurement devices is a difficult and tedious task as each strain measurement device would be individually positioned, placed, and/or coupled to the bicycle component, for example manually with a set of forceps or tweezers. After attaching to the component, the strain measurement devices were then communicatively coupled in some way to processing circuits installed separately and/or subsequently to the strain measurement devices. This traditional type of strain measurement device and separate circuitry construction and assembly requires a significant amount of effort, and is very costly.

SUMMARY

In an embodiment, a chainring structure includes a torque output section comprising a plurality of sprockets having two axially bounding sprockets defining an inner-most and outer-most sprocket. The chainring structure also includes a torque input section configured to attach to a crank assembly. The chainring structure also includes a power meter chamber disposed radially between the torque input section and the torque output section, the power meter chamber including a base surface of a strain measurement section. A power meter is disposed in the power meter chamber and has at least one strain measurement device attached to the base surface. The torque output section, torque input section, and power meter chamber of the chainring structure are formed as a unitary single piece and configured to dispose the base surface axially between the axially bounding sprockets of the plurality of sprockets.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

Figure 1A:
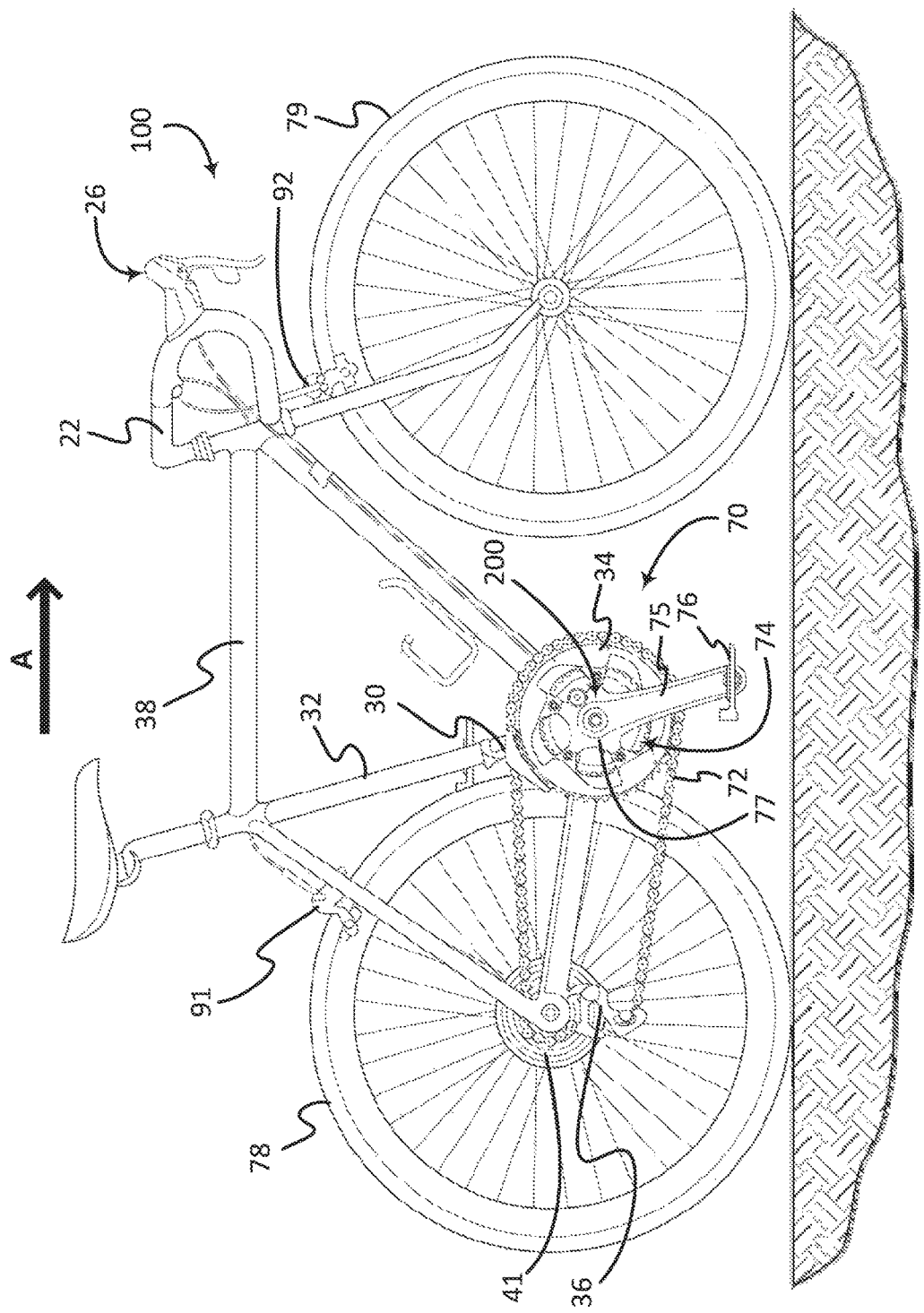
FIGS. 1A-1B are side views of bicycles, which may be used to employ one or more power meters.

Strain measurement devices may be physically integrated with the operational circuitry of a bicycle power meter. Physically integrating strain measurement devices and operational circuitry structure may cause the construction and/or precise positioning of power meter components to be accomplished in a less expensive and/or less resource intensive manner. The strain measurement devices may be attached directly to a physical structure containing the power meter operational circuitry, such as a printed circuit board ("PCB") substrate, thus coupling the strain measurement devices and the power meter circuitry into a singular power meter PCB assembly. Further, fixably attaching the strain measurement devices to the PCB such that the position of the strain measurement devices in a plane of the PCB substrate is fixed relative to other components of the PCB assembly may allow for easier alignment and/or positioning of the strain measurement devices. For example, the alignment of the strain measurement devices may be established based on alignment of features of the PCB, which may be features of the PCB substrate and/or other PCB components.

Power meters may be used with different bicycle components to determine power transmissions through the component. In an embodiment, the power meter may be used in combination with the drive train of a bicycle. For example, the power meter may be integrated with a chainring and/or a chainring carrier for measuring power transmitted from through the crank arms and/or shaft through the chainring drive assembly and to the chain or belt of the drivetrain. The power meter may also be integrated with other elements of the drivetrain, such as a rear cog or cassette operatively coupled with the rear wheel, a crank arm or pedal, and/or a rear wheel hub.

Power meters may also be coupled with other components, such as one or more brake rotors of a bicycle with a disc-braking system. The power meter may be configured so as to dispose strain measurement devices radially between a wheel hub attachment section and one or more friction surfaces of a rotor and/or rotor assembly. Strain measurement devices disposed in this manner can measure the strain of the rotor and/or rotor assembly caused by the dissipation of motive forces between rotational forces of the road acting on the front and/or rear wheel of the bicycle and the friction surfaces of the rotor and/or rotor assembly where the motive forces are dissipated into other forms of energy, such as heat energy. This is believed to provide a measure of braking power or power dissipation of the braking system. In an embodiment, the power meter may be integrated with a carrier of the rotor and/or rotor assembly. As such, one or more strain measurement devices may be disposed on the carrier radially between a torque input section and a torque output section of the rotor carrier. For example, the one or more strain measurement devices may be disposed on the rotor carrier between a radially inner wheel hub connection section and a radially outer attachment section to an annular rotor member, the annular rotor member containing the friction or power dissipation surfaces.

In an embodiment, the power meter may be configured for use in an application wherein the transmission of power across a component involves a dissipation of energy as heat energy, such as a brake rotor application. To accommodate the additional heat energy, and/or the dissipation thereof, the power meter may include heat dissipation features, such as ribs, fins, or other features. For example, a rotor assembly may include a carrier, and the carrier may include the heat dissipation features. The heat dissipation features may be disposed and/or formed on a surface of the carrier, facilitating the transfer of the heat energy into an ambient environment, such as the surrounding air. These features dissipate the heat energy to maintain and/or limit a temperature of the rotor assembly to protect a PCB assembly of the power meter.

A bicycle may use multiple power meters. In an embodiment, a bicycle includes at least one power meter configured to measure the power input to the drive train of the bicycle, and at least one power meter configured to measure the power dissipated by the braking system. For example, a first power meter may be integrated with at least one chainring of the drivetrain, as is described herein, and a second and third power meter may be integrated with a front rotor and a rear rotor of the bicycle braking system, respectively. The values from these three power meters may be used to compare the amount of power input to the bicycle, and the amount of power dissipated by the braking system. The difference between these values may be attributed to rolling resistance of the bicycle, air resistance due to ambient air surrounding the bicycle during use, or other factors. In an embodiment, the three power meters are configured to transmit the measure power values to one or more component of the bicycle, such as a cycle computer, or other portable computing device or computer. For example, the three power meters may be configured to transmit the values representing the measured power to a same bicycle component, mobile computing device, or computer.

Figure 1B:
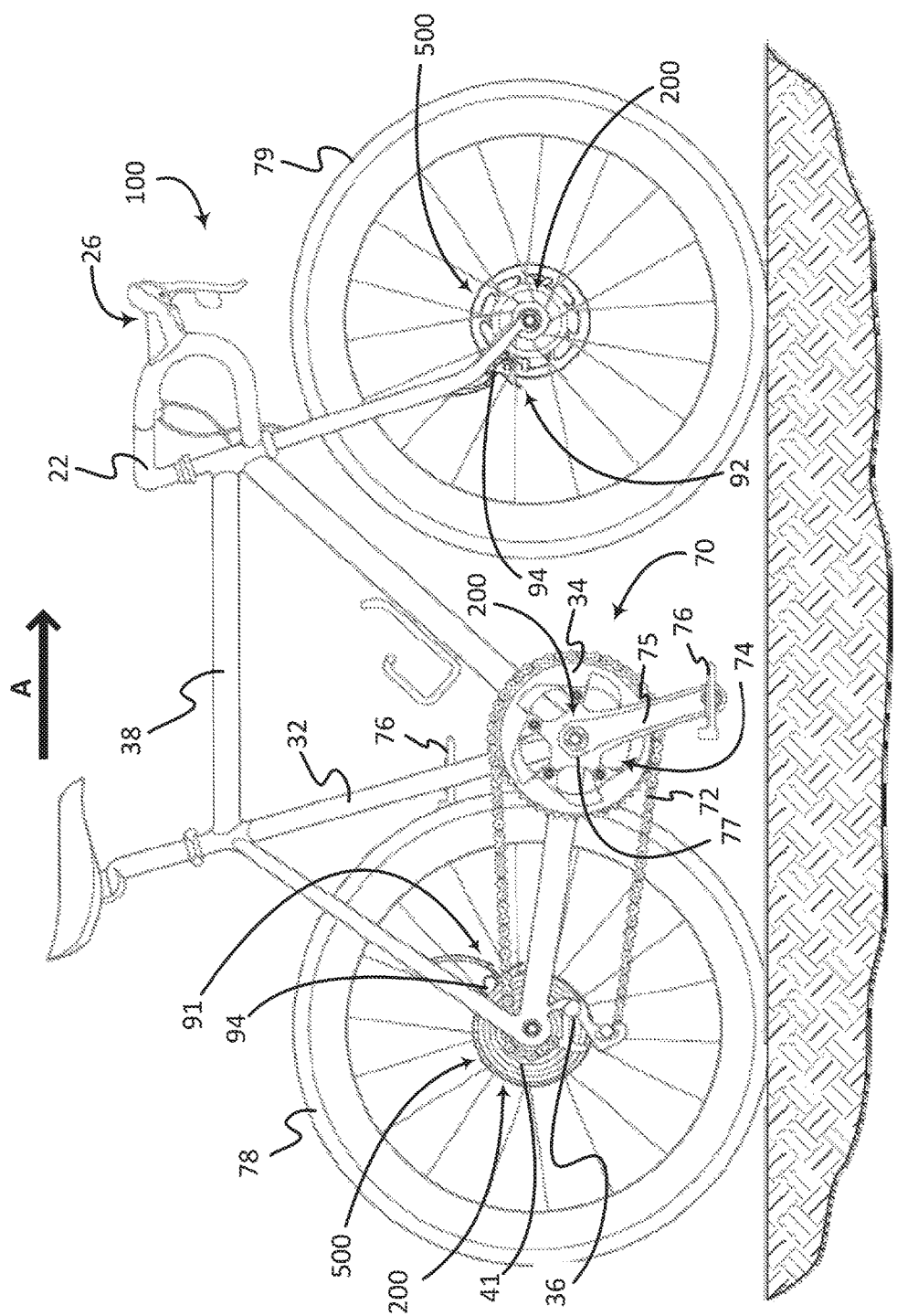

FIGS. 1A-1B generally illustrate bicycles 100 with which a power meter may be used. The bicycle 100 includes a frame 38, front and rear wheels 79, 78 rotatably attached to the frame 38, and a drivetrain 70. A front brake 92 is provided for braking the front wheel 79 and a rear brake 91 is provided for braking the rear wheel 78. The front and/or forward orientation of the bicycle 100 is indicated by the direction of arrow "A." As such, a forward direction of movement for the bicycle is indicated by the direction of arrow A.

The illustrated bicycle 100 may be a road bike having drop-style handlebars 22, a mountain bike, or any other type of bicycle. The present invention has applications to bicycles of any type, including fully or partially suspensioned mountain bikes and others, as well as bicycles with mechanically controlled (e.g. cable, hydraulic, pneumatic) and non-mechanical controlled (e.g. wired, wireless) drive systems.

The bicycle 100 may include one or more shift units 26, mounted to the handlebars 22. A front gear changer or front gear shift mechanism 30, such as a front derailleur, may be positioned on the frame 38, such as on the seat tube 32, adjacent the front sprocket assembly 34 so as to effect gear changes to the front sprockets or an associated structure. A rear gear changer or rear gear shift mechanism 36, such as a rear derailleur, is mounted to a member of the frame 38 of the bicycle, such as a mount, rear dropout, and/or an associated structure, in a position to effect gear changes in a rear sprocket assembly 41. In some embodiments, the bicycle may only include a front or only a rear gear changer.

The drivetrain 70 comprises a chain 72, the front sprocket assembly 34, which is coaxially mounted with a crank assembly 74, and the front gear change mechanism 30, such as a derailleur. The drivetrain also includes the rear sprocket assembly 41 coaxially mounted with the rear wheel 78, and the rear gear change mechanism 36, such as a rear derailleur.

The crank assembly 74 includes pedals 76, two crank arms 75, and a crank spindle (not shown) connecting the two crank arms 75. The crank assembly may also include other components. For example, the crank assembly 74 may also include a chainring carrier or spider 77 configured to transfer torque between one or more of the crank arms 75 and the front sprocket assembly 34. In another embodiment, the crank arms 75 and the front sprocket assembly 34 may be torque transmittingly coupled in other ways, such as by being directly attached to the crank spindle.

The drivetrain 70 may also include a power meter 200. The power meter 200 may be configured to be coupled with, or a part of, the crank assembly 74. The power meter 200 may be integrated with a body, such as the chainring carrier 77 or rotor carrier 577, and may include one or more strain measurement devices 260, such as strain gauges, arranged in a generally annular pattern about the body. The strain measurement devices 260 are connected to circuitry and/or other sensors to generate power information, which may be transmitted to another bicycle component or external device for further processing and/or display. Alternatively, the power meter 200 may be coupled with the chainring assembly 34 directly, for example without the use of a chainring carrier 77.

The power meter 200 may also, or alternatively, be included with other components of the bicycle. In an embodiment, such as that shown in FIG. 1B, the power meter 200 may be integrated with a braking system to measure and/or otherwise detect braking power. For example, the power meter 200 may be integrated with one or more rotors 500 of a disc-braking system. As illustrated in FIG. 1B, a disc-braking system may be a system having a caliper 94 configured to apply a braking force to the rotor 500. Including a power meter with a brake rotor 500 may allow a user to determine the power dissipated by the braking system. Including a power meter with the brake rotor 500 may also, or alternatively, provide an indication of the braking forces applied to the rotor 500.

As is illustrated in FIG. 1B, a bicycle 100 may include one or more power meters. For example, the bicycle may have a power meter configured to measure power input to the drive train 70 and the bicycle may have one or more power meters configured to measure brake forces and/or power dissipation. For example, the bicycle 100 may include a power meter 200 integrated with brake rotors 500 configured in the braking systems of the front wheel 79 and the rear wheel 78. In an example, the bicycle 100 may include a power meter 200 integrated with brake rotors 500 configured in the braking systems of the front wheel 79 and the rear wheel 78.

The power meter 200 may include an annular printed circuit board ("PCB") with strain measurement devices attached directly to the PCB. For example, the strain measurement device may be electrical resistance type strain gauges that are generally planar and/or laminar in construction with a layer of conductive metal formed in one or more patterns on a non-electrical substrate, film, paper, or other material. The conductive metal pattern or patterns may be formed of various metallic constructions, including foil and/or wire. The conductive metal pattern or patterns may be formed of any metal or metal alloy. For example, copper or copper alloys such as constantan may be used. Planar strain measurement devices also may include electrical contact connection surfaces configured for connection to circuitry of the PCB.

The PCB has a substrate to which components of the PCB are applied and/or attached. The substrate may form the structure and/or shape of the PCB. The substrate may be any substance operable to form the underlying attachment of the PCB components. For example, silicon, silicon dioxide, aluminum oxide, sapphire, germanium, gallium arsenide ("GaAs"), an alloy of silicon and germanium, or indium phosphide ("InP"), may be used. The substrate may be rigid or flexible. In an embodiment, the substrate forms an annular rigid ring. The rigid ring may be one continuous piece of substrate material. In an embodiment, a substrate ring has an inner diameter and an outer diameter defining the extents of the substrate there between. In an embodiment, the substrate may be sized, shaped, and/or otherwise configured to position strain measurement devices relative to a body of a bicycle component so as to measure torsional strain, such as the strain caused by the relative difference in rotation of an inner radial position of the body and an outer radial position of the body.

The connection to the circuitry of the PCB may be accomplished using any technique. In an embodiment, the connection is accomplished through an application of layer of a conductive medium, such as solder, between the electrical contact connection surfaces of the planar strain measurement device and contact connection surfaces of the PCB which provide electrically communicative contact with other electronic components connected to the PCB, such as a processor, memory, other sensors, and/or other electric or electronic devices. Such connection may be made directly, without the use of an intermediate conductive connector, such as an elongated electrical lead, wire, or other device. For example, the conductive medium may be bounded on opposing sides by the electrical contact connection surfaces of the PCB and strain measurement device. In this example, the electrical contact connection surfaces of the PCB and strain measurement device may be secured substantially parallel and opposing each other by the conductive medium. Further, as is described above, the connection may provide that the strain measurement device is fixably attached to the PCB substrate such that the strain measurement device is secure and not movable in a radial plane of the PCB substrate relative to other features and/or components of the PCB. As described herein, the PCB may be attached to a body of a drivetrain to form a power meter. Such a body may be any body having a torque input section and torque output section. For example, drive train components such as a chainring, a chainring carrier, a crank arm, a spindle, and/or a pedal may be used as a body for attachment of the PCB, or components of the PCB. Alternatively, the PCB may stand alone as the power meter.

Figure 2:
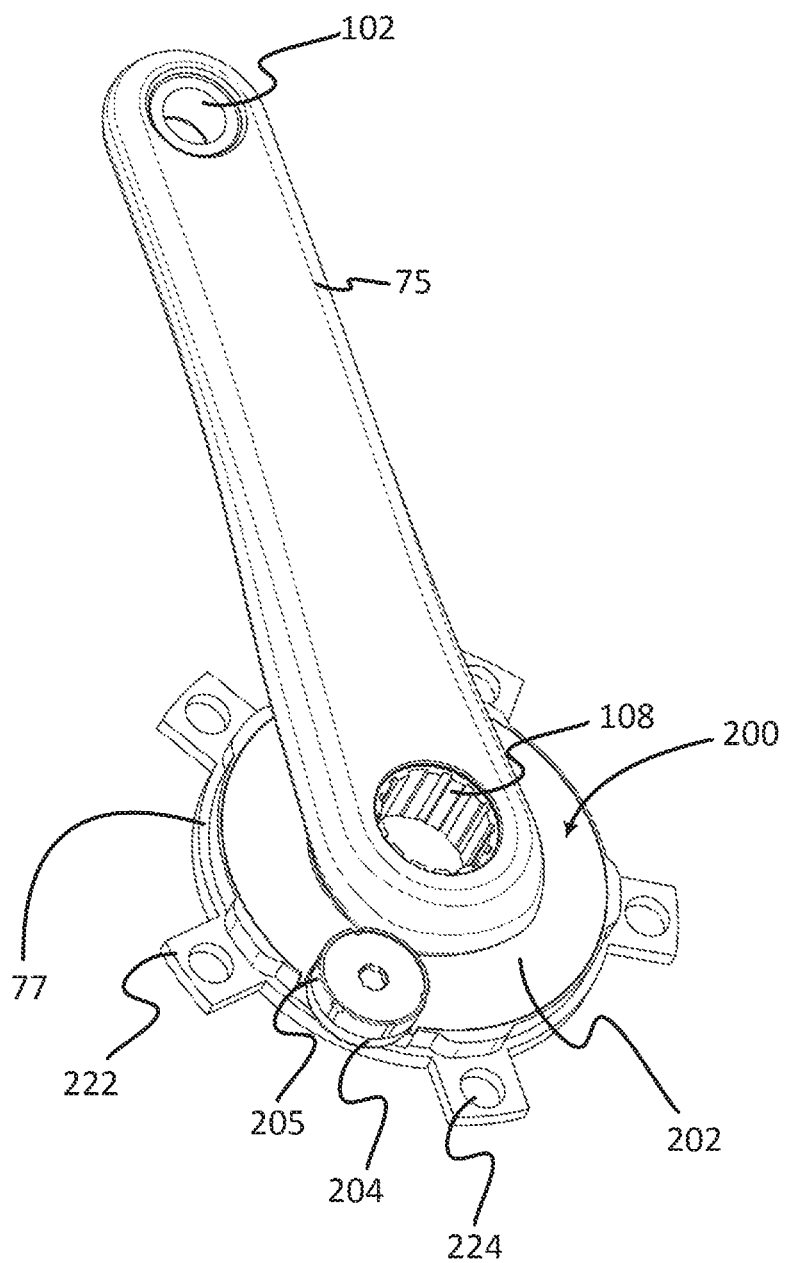
FIGS. 2-4 illustrate an embodiment having a power meter integrated with components of a bicycle drivetrain, such as the drivetrain for the bicycle of FIG. 1A or 1B.
Figure 3:
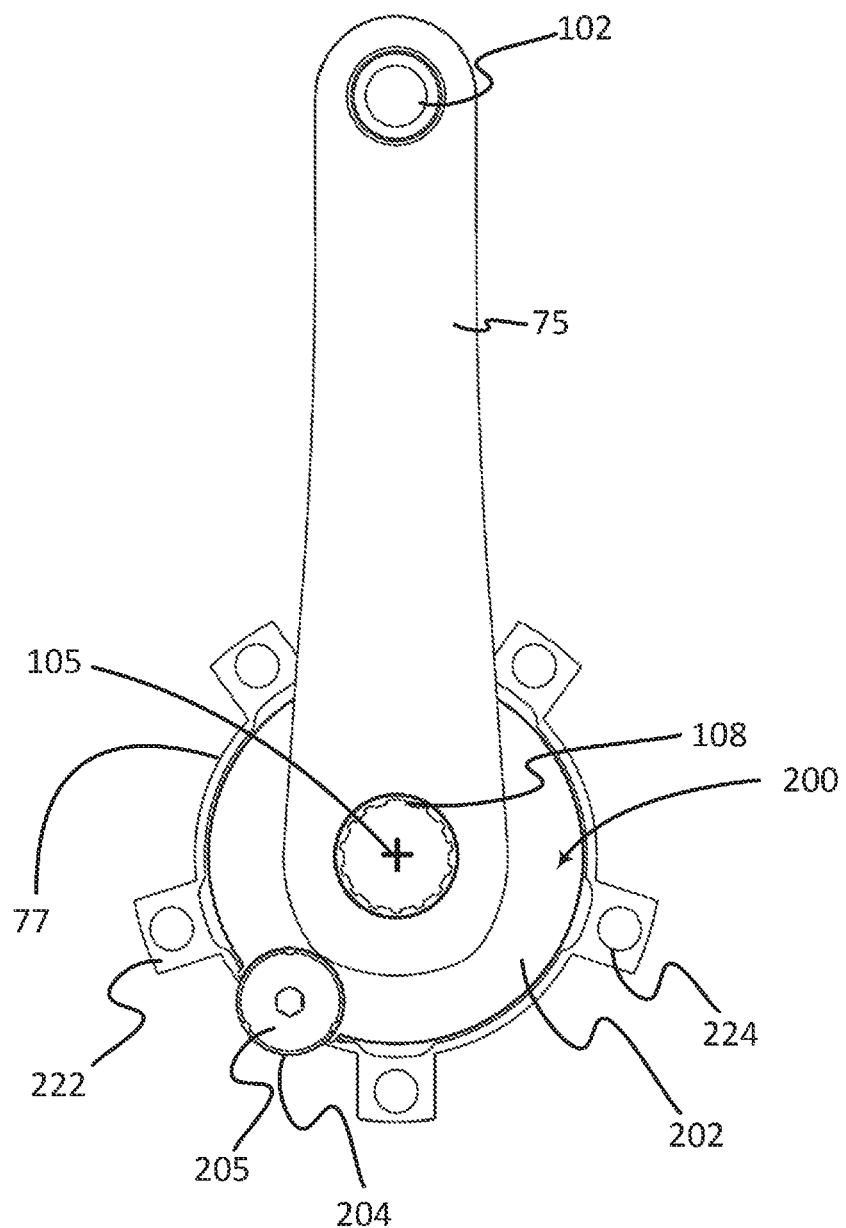
Figure 4:
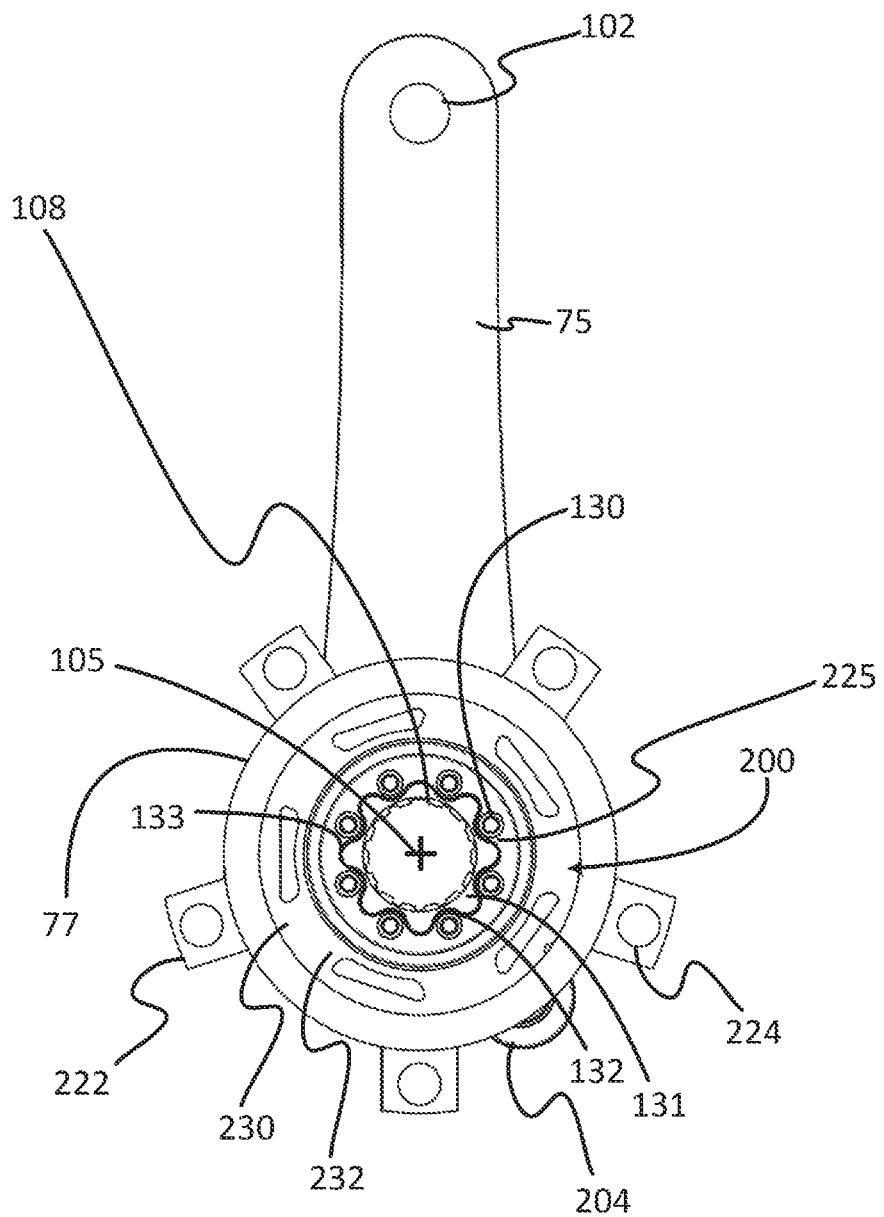

FIGS. 2-4 show a body, such as a chainring carrier and/or crank arm, of a bicycle drivetrain having an integrated power meter 200. The bicycle drivetrain may be the drivetrain 70 for the bicycle 100 of FIG. 1A or 1B. FIG. 2 shows a perspective view of the drivetrain components, FIG. 3 shows a top view of the drive train components, and FIG. 4 shows a bottom view, opposing that of FIG. 3, of the bicycle components. In this embodiment, the body is a chainring carrier 77, or spider. The chainring carrier 77 may be made of any material operable to transmit torque, and a resulting power, between a torque input section (225 described below with respect to FIGS. 5-9) and a torque output section 222. For example, aluminum alloys may be used. A crank arm 75 is shown attached to the chainring carrier 77. The crank arm 75 has a pedal attachment section 102 to which a pedal 76 may be attached such that a bicycle rider may input pedaling forces into the bicycle drive train. These pedaling forces result in a torque that causes the crank arm 75 and attached chainring carrier to rotate about a crank or rotation axis 105. The crank arm 75 has a spindle attachment feature 108 that provides for attachment to a spindle that connects a crank arm and pedal assembly disposed on an opposing side of the bicycle to facilitate pedaling with both feet of the bicycle rider. The spindle attachment feature 108 may be any feature operable to transfer torque, such as a splined interface. As such, torque from either crank arm 75 may be transferred into the chainring carrier 77 through the crank arm 75 attachment to the chainring carrier 77. The crank arm 75 may be attached to the chainring carrier 77 using any technique operable to transmit torque between the crank arm 75 and a torque input section 225 of the chainring carrier 77. In an embodiment, the crank arm 75 is connected as is described in U.S. Patent Application Publication 2015/0082939.

For example, a crank arm 75 and chainring carrier 77 may be attached with corresponding features and with a distinct torque transmitting connection, such as with a bolted connection. In this example, the chainring carrier 77 is sized and shaped to connect to the crank arm 75. A first pairing feature 131 is formed on one of the crank arm 75 and the chainring carrier 77 and a second pairing feature 132 is formed on the other of the crank arm 75 and the chainring carrier 77 to position the chainring carrier on the crank arm. A clearance 133 is defined between the first and second pairing features 131, 132 when the first and second pairing features 131, 132 are paired. A torque-transmitting coupling 130, such as through bolted connection, is formed on the crank arm 75 and the chainring carrier 77 configured to transmit substantially all of the torque applied to the chainring carrier 77 from the crank arm 75.

A power meter cover 202 is provided to protect other power meter components installed within and/or on the body, such as a PCB assembly described below with respect to FIGS. 9-12. The power meter cover 202 may be constructed of any material operable to provide for the protection of the internal power meter 200 components. For example, aluminum alloys may be used. In an embodiment, the power meter 200 may communicate signals wirelessly and the power meter cover 202 may be made of a material that is radio frequency ("RF") transparent, such as polycarbonate or other materials. Also, a raised section 213 of a cover 212, as is illustrated in the embodiment, may be configured so as to cover an antennae and/or other wireless communication device of the power meter, and the raised section may be provided in an RF transparent material. Further, the raised section 213 may be formed of an RF transparent material and the rest of the cover may be formed of a material having a higher interference with RF signals, such as a metal or carbon fiber composite. The power meter cover 202 may be attached to the body, in this embodiment the chainring carrier 77, using any technique. For example adhesives may be used to attach the power meter cover 202. A power supply casing 204 is also provided to both secure and protect a power supply for the power meter 200. In an embodiment, the power supply casing 204 includes a removable power supply cover 205 to provide access to the power supply. A torque output section 222 is shown on the chainring carrier 77. Provided in the torque output section 222 in the displayed embodiment are torque output member attachment features 224, such as a plurality of bolt holes, which are configured to provide attachment to a chainring or other torque transmitting component of the bicycle drivetrain.

The chainring carrier 77 includes a strain measurement section 230, which may include one or more strain measurement features 232. The strain measurement features 232 are formed into the chainring carrier 77 to provide for positioning of strain measurement devices to detect and/or quantify mechanical deformations of the chainring carrier 77 due to torque applied between the torque input section 225 and the torque output section 222. For example, the strain measurement devices may be electrical resistance type strain gauges attached to the strain measurement features 232.

Figure 5:
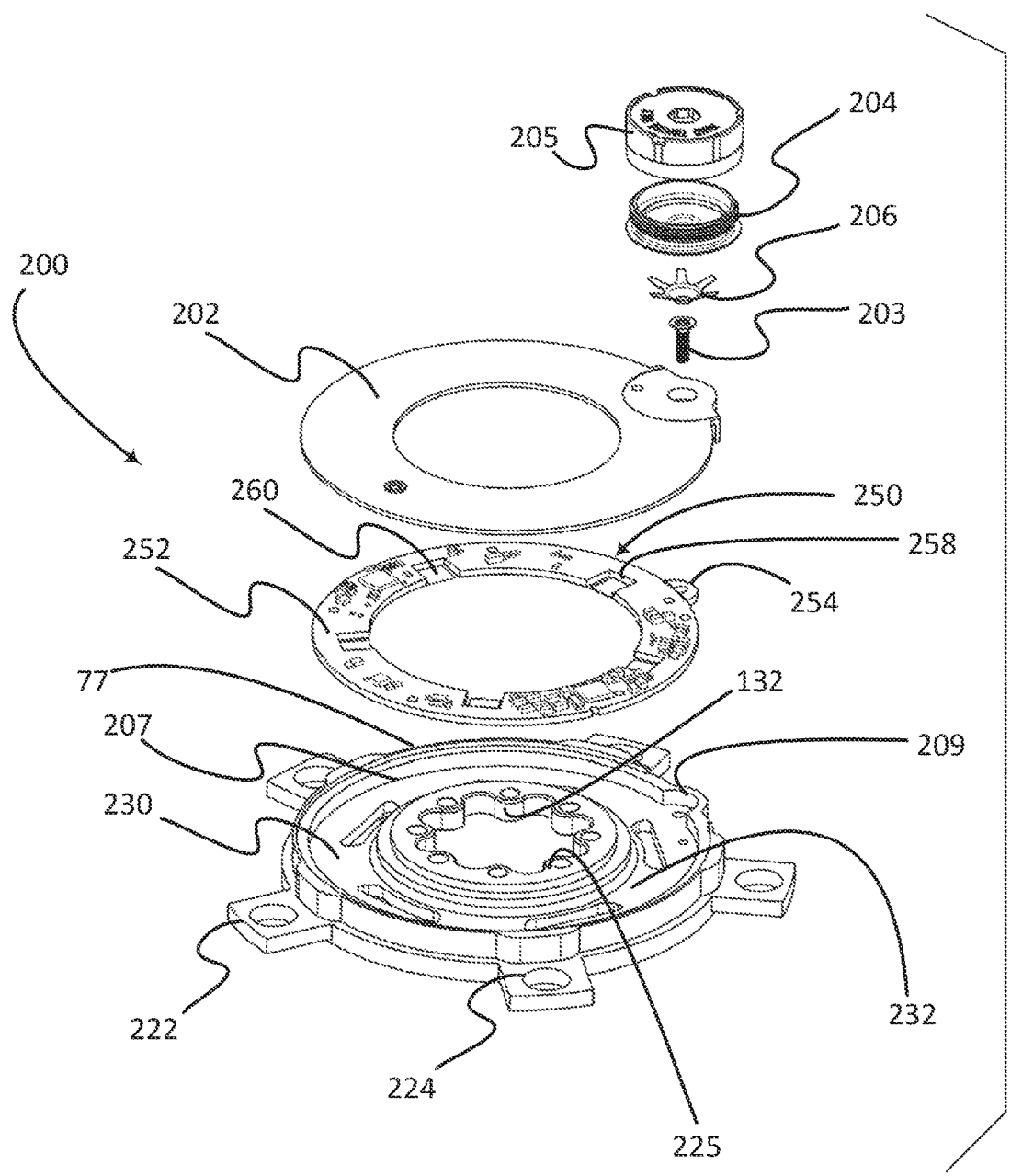
FIG. 5 is an exploded view of the power meter integrated with a chainring carrier of FIGS. 2-4.
Figure 6:
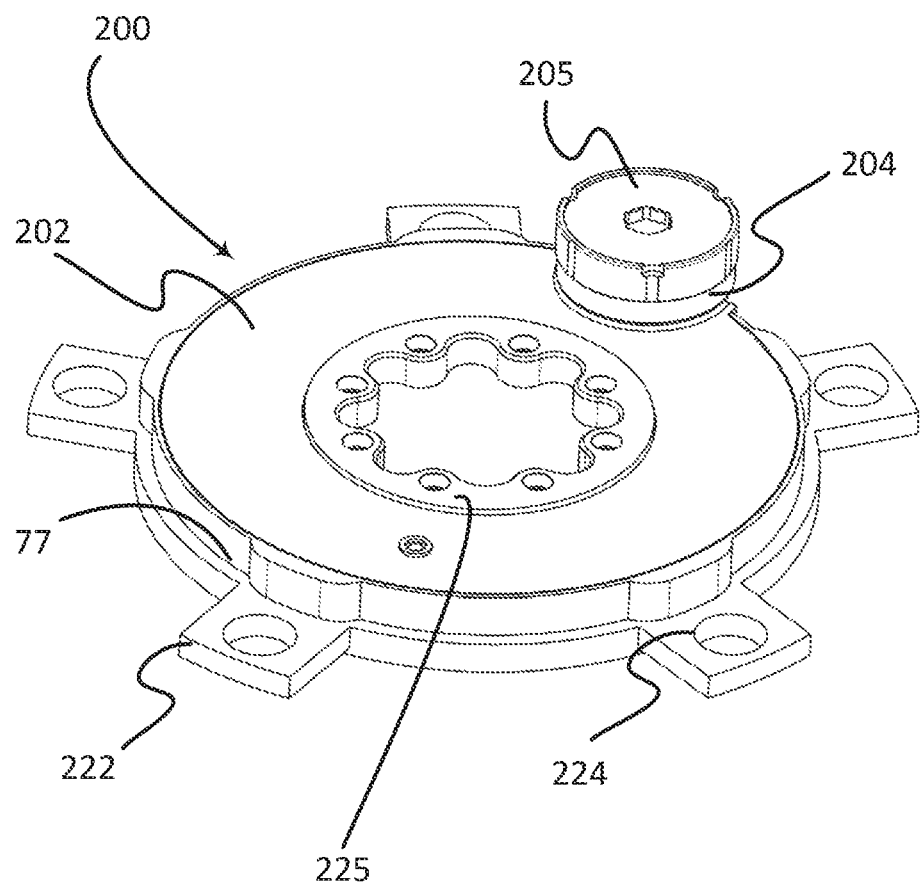
FIG. 6 is a perspective view of the chainring carrier of FIGS. 2-4.
Figure 7:
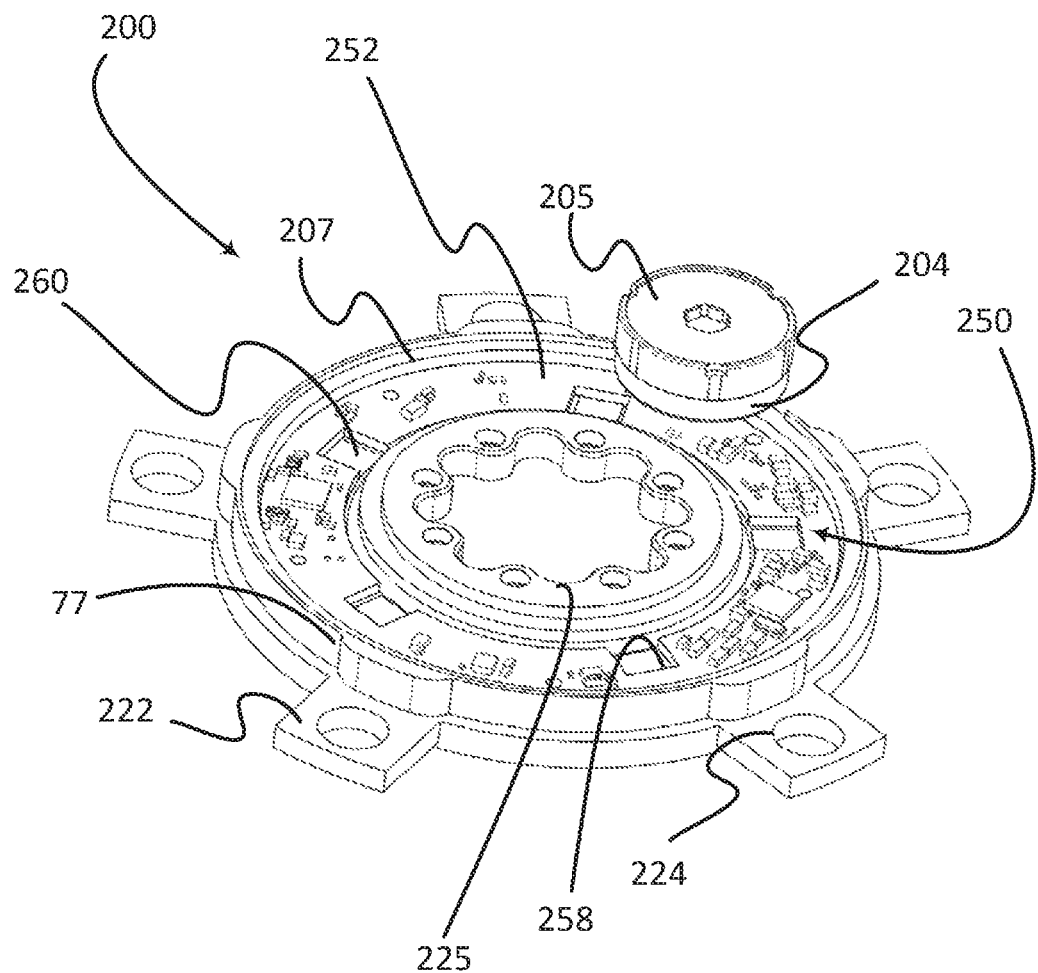
FIGS. 7-9 illustrate various views of the chainring carrier of FIG. 6, with a cover removed.
Figure 8:
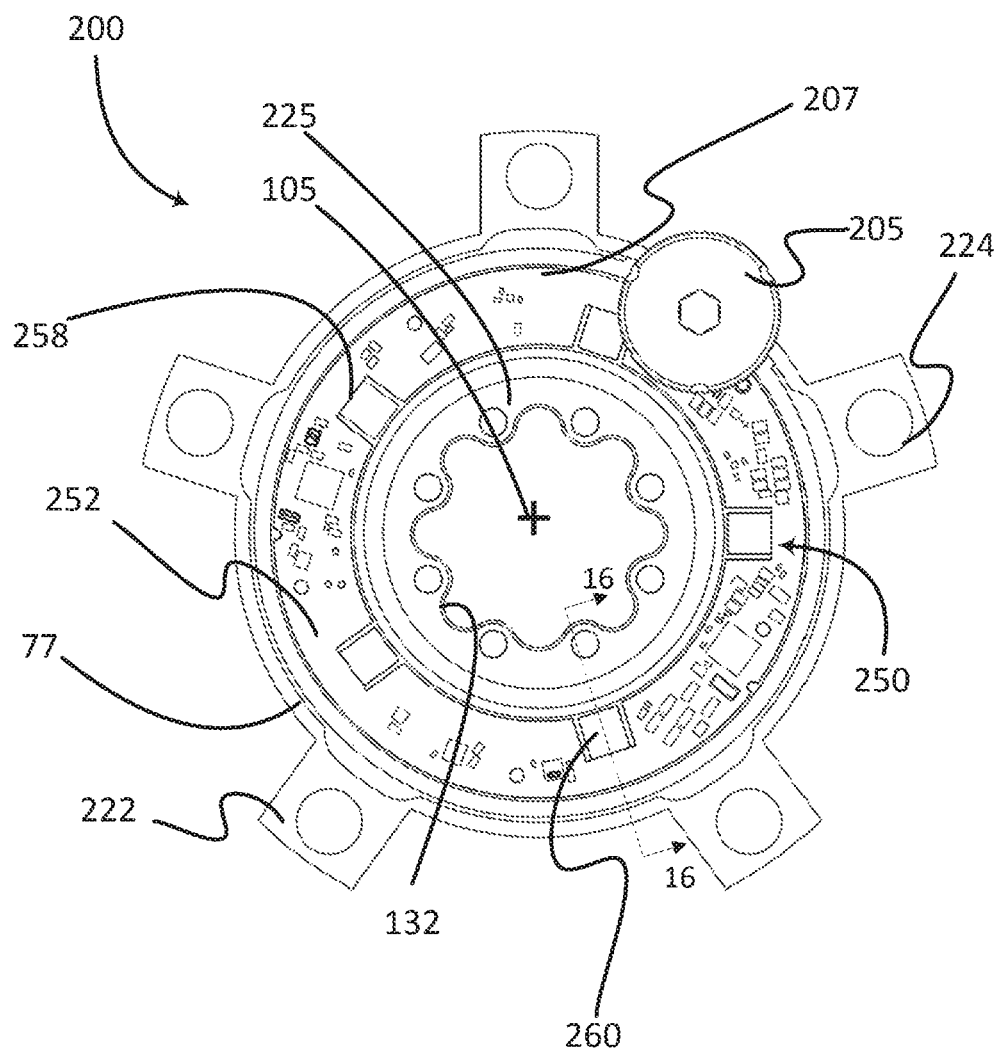
Figure 9:
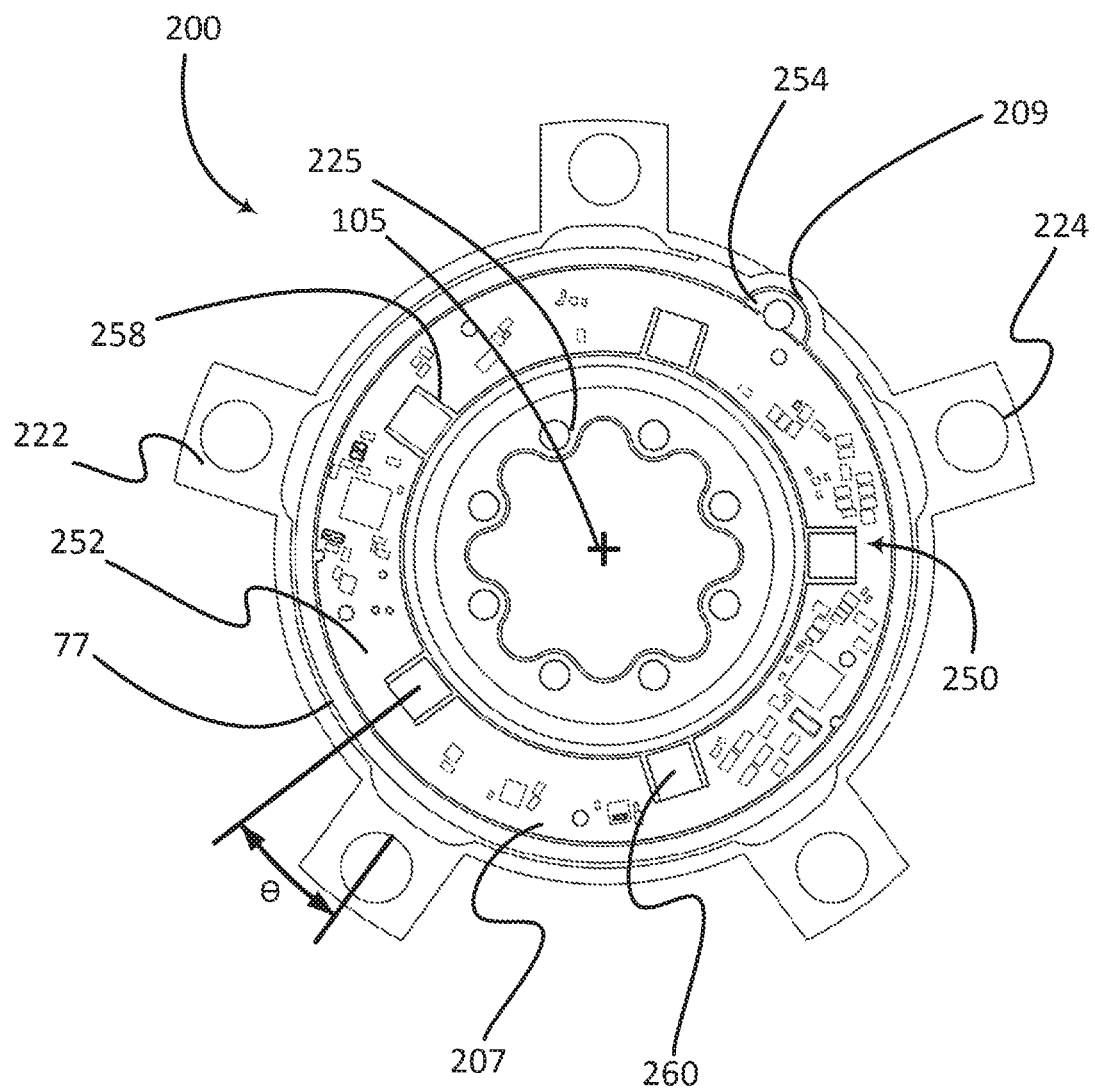

FIGS. 5-9 show the chainring carrier 77 of FIGS. 2-4. FIG. 5 illustrates an exploded view of the chainring carrier 77 and other components of the power meter 200. FIG. 6 shows a perspective view of the chainring carrier 77. FIG. 7 shows a perspective view of the chainring carrier 77 with the power meter cover 202 removed. FIG. 8 shows a top view of the chainring carrier 77 with the power meter cover 202 removed, and FIG. 9 shows the same top view of the chainring carrier 77 with the power supply components hidden from view. As used herein, a power meter may include various components. In an embodiment, a power meter may include all of the components indicated in FIG. 5. More or fewer components may be included in the power meter 200. For example, the power meter may be the components of FIG. 5, without the chainring carrier 77.

As shown in FIGS. 5 and 7-9 the chainring carrier 77 includes a cavity 207 configured for installation of the PCB assembly 250 and/or other power meter 200 components. The cavity 207 may include an alignment feature 209 which corresponds to substrate alignment feature 254 formed in a substrate 252 of the PCB assembly 250. As can be seen in FIG. 9, wherein the power supply components are hidden from view, through the correlation of these alignment features 254, 209 the PCB assembly 250 may be appropriately aligned with the chainring carrier 77. Other alignment features may also be used and/or formed into the PCB substrate 252.

The PCB assembly 250 also includes a plurality of strain measurement devices 260 attached to the substrate 252 and/or other parts of the PCB assembly 250. The strain measurement devices 260 are configured to provide a signal indicative of strain in an attached body. The signal may be interpreted and acted upon by circuitry 28 of the power meter, for example as is described with respect to the power meter system 40 of FIG. 17. The circuitry 28 may be configured to interpret the signal indicative of strain, and calculate a corresponding mechanical power being transmitted through the attached body.

In the displayed embodiment the strain measurement devices 260 are attached at strain measurement device attachment features 258 formed in the substrate 252. Further features and/or characteristics of the PCB assembly 250 are discussed below with respect to FIGS. 10-12.

In the displayed embodiment, the strain measurement device attachment features 258 form a vacancy or void. The void may provide access to the strain measurement devices 260 in an axial direction of the PCB assembly 250, such as along a direction of the axis of rotation 105. This access may be used during installation of the PCB assembly 250 into a body such as the chainring carrier 77. For example, to generate a quality attachment of the strain measurement devices 260 a clamp may be used for attachment to the body during a curing process. As shown, the strain measurement device attachment features 258 are configured to allow the attachment of the strain measurement devices 260 so that the strain measurement devices do not protrude beyond an inner diameter 251 of the substrate 252. This configuration may provide for a maximized substrate 252 surface area available for circuitry implementation, but a minimized total surface area of the PCB assembly, particularly in an annular substrate implementation wherein such a configuration may optimize and/or minimize the radial extents of the PCB assembly installation. Further, the strain measurement device attachment features 258 may be disposed so as to circumferentially correlate with bolt holes 224 of the torque output section 222. For example, the device attachment features 258 may be circumferentially separated by an angle θ. In an embodiment, the angle θ may be 10 degrees to 20 degrees. In an embodiment, a number of strain measurement device attachment features matches a number of strain measurement features and/or bolt holes 224 of a torque output section 222.

As shown, the strain measurement devices 260 are attached at a radially inner edge of the substrate 252. Alternatively, the strain measurement devices 260 may be attached at a radially out edge of the substrate 252, or between the radially inner and radially outer edge of the substrate 252.

The power supply for the power meter 200 is attached both physically and electrically using a contact structure 206 and a metallic screw 203. As shown, the alignment feature 209 also provide for the attachment of the power supply for the power meter 200 using the metallic screw 203. Alignment features may be provided without facilitation for power supply attachment as well.

Figure 10:
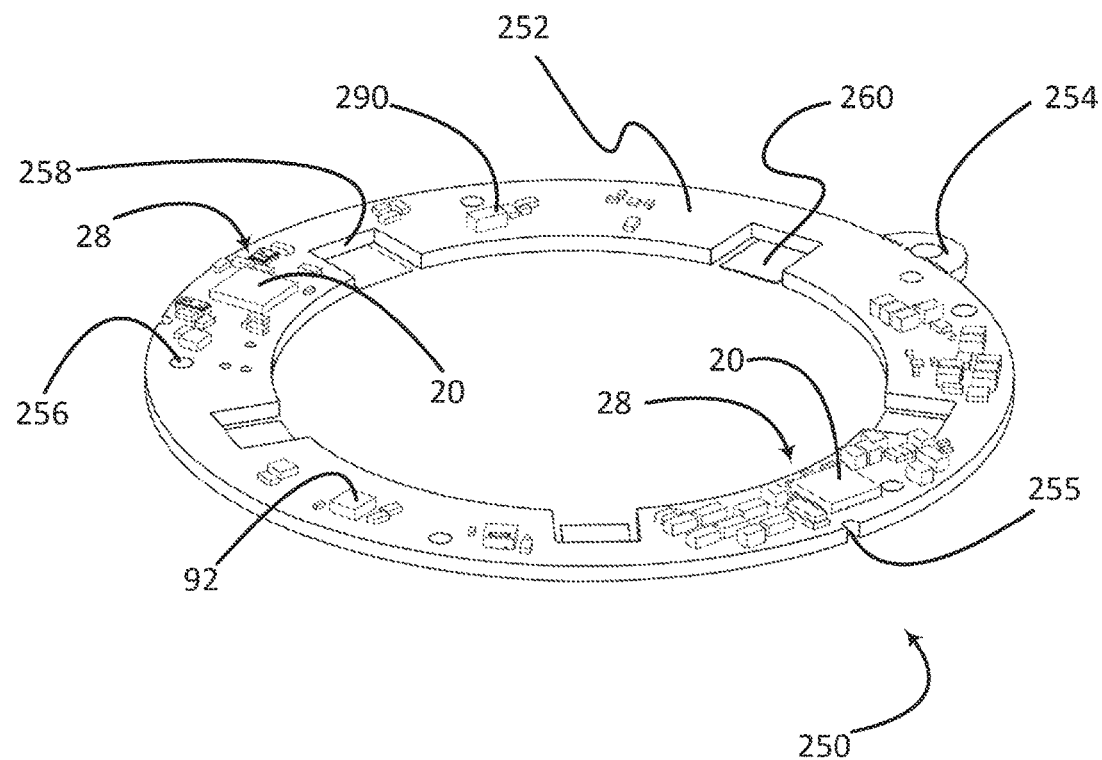
FIGS. 10-12 illustrate various views of a printed circuit board ("PCB") of the power meter of FIGS. 7-9.
Figure 11:
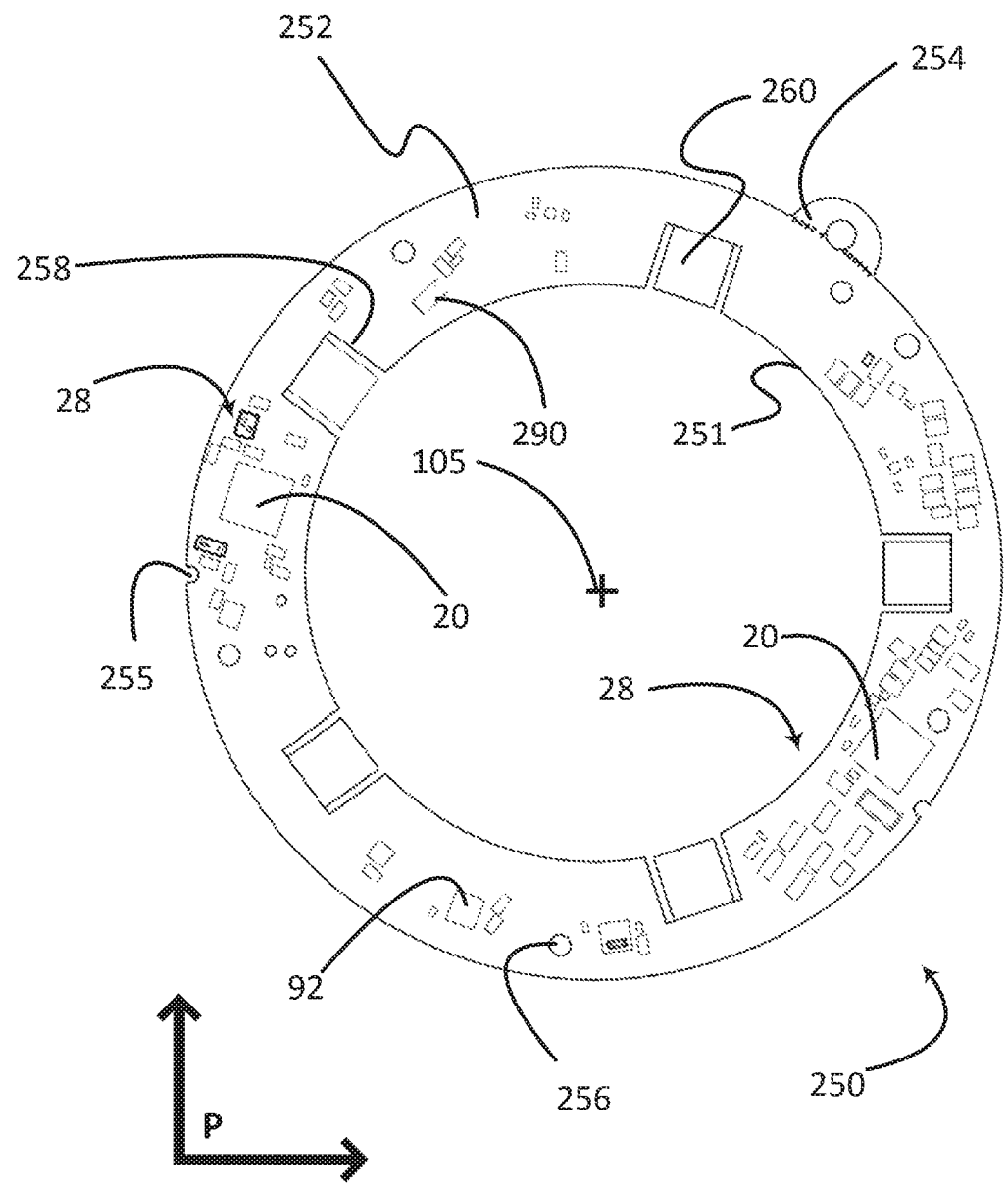
Figure 12:
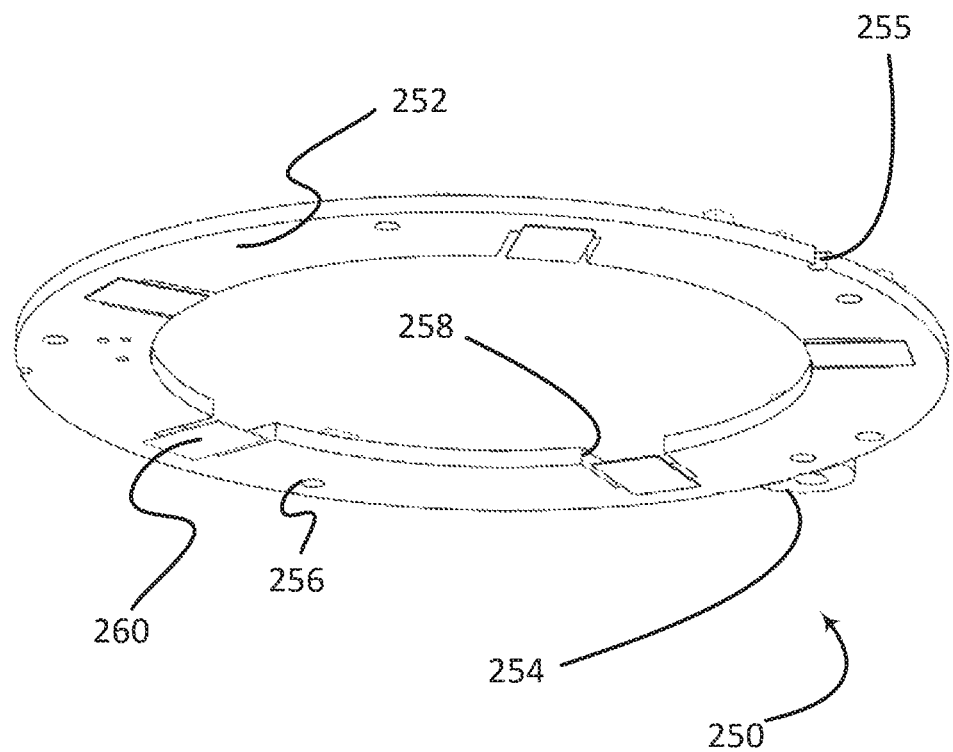

FIGS. 10-12 show the PCB assembly 250 of the power meter 200. FIG. 10 shows a top perspective view of the PCB assembly 250. FIG. 11 shows a top view of the PCB assembly 250, and FIG. 12 shows a bottom perspective view of the PCB assembly 250. The PCB assembly 250 includes circuitry 28 as is described further with respect to FIG. 17 below. The circuitry 28 may involve one or more processors 20, as well as other electric and/or electronic components as well as additional sensors 93, such as an accelerometer. The circuitry may also include one or more antennae 290 as part of the communication interface 90. Additional or alternative alignment features 255, 256 used for aligning the PCB assembly 250 to a body of a bicycle drivetrain may be formed into the substrate 252 of the PCB. For example, one or more notches 255 may be cut into an interior and/or exterior edge of the substrate 252. The notches 255 may be configured to correspond to corollary features of the body to which the PCB assembly 250 is to be attached. Also, one or more holes 256 may be formed in the substrate 252 which may be used by an assembly tool or handler to specifically attach to the PCB assembly 250 in a particular orientation. The tool and/or handler may then be aligned to the body to which the PCB assembly is to be attached such that the PCB assembly 250 is aligned properly to the body. For example, the alignment features 256, 255, 254 may be used independently or in combination to align the one or more strain measurement devices 260 to the body.

The substrate 252 operates to connect, and/or provide structure for the circuitry and attached components of the PCB assembly 250. The substrate 252 may be flexible or rigid. In an embodiment, the substrate 252 is a rigid substrate providing a durable basis for the PCB assembly 250. The substrate 252 is formed to provide shape and other substance for the PCB assembly 250. For example, as shown, the substrate 252 is formed in an annular construction and/or shape. Such an annular shape facilitates installation of the PCB assembly 250 around a torque input section of a body.

At least one strain measurement device 260 may be attached to the PCB assembly 250 such that the at least one strain measurement device 260 is fixed in a plane P of the PCB assembly 250 relative to at least one feature of the PCB assembly 250. For example, the strain measurement devices 260 may be fixed relative to one or more of the alignment features 254, 255, 256 and/or a circuitry 28 component such as the processor 20. The plane P may be a plane formed to include the substrate 252. In an embodiment, the plane P is perpendicular to the axis of rotation 105. An annular construction of the substrate 252, and rigid attachment of the strain measurement devices 260 as described above, provides for the disposition of a plurality of strain measurement devices 260 around the annular shape and about the torque input section. Such an annular construction also allows for the disposition of the strain measurement devices between the torque input section and the torque output section.

In an embodiment, a chainring structure may be formed with an integrated power meter chamber that is configured to house a power meter 200. The power meter chamber includes a base surface that is configured for attachment to the power meter 200. For example, the base surface may be configured for attachment to strain gauges of the power meter 200. The chainring structure includes teeth in the power output section. For example, the chainring structure may include teeth forming one or more sprockets. The particular disposition of the base surface relative to the teeth and/or sprockets can affect an accuracy of a measurement of torque and/or power transmitted through the chainring structure. In an embodiment, the particular relative disposition of the base surface relative to the sprockets and teeth along a rotational axis of the chainring structure can affect the measurement of the torque and/or power transmitted through the chainring structure using the power meter 200.

Figure 13A:
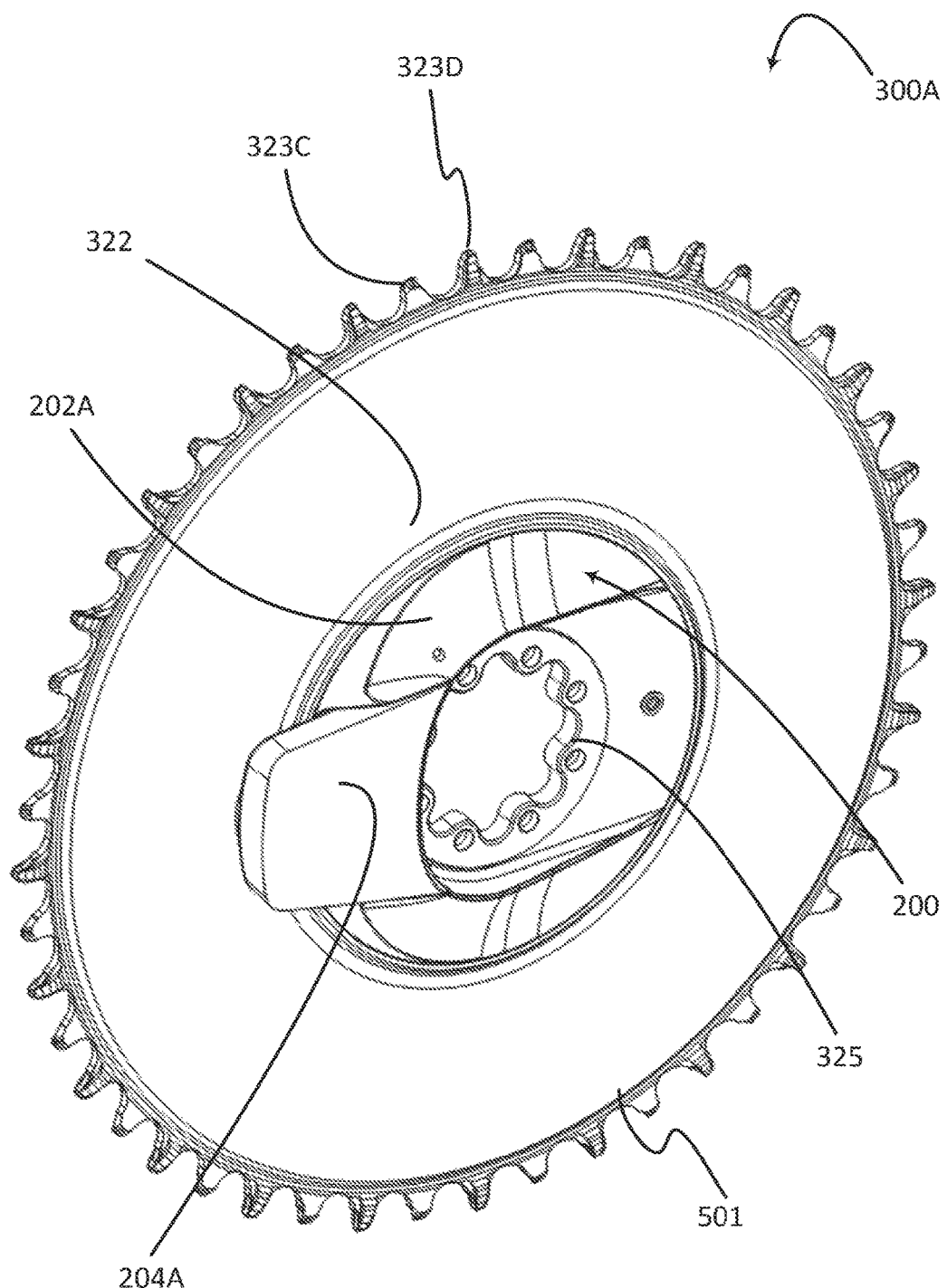
FIGS. 13A-13D illustrate various views of a power meter integrated with a chainring.
Figure 13B:
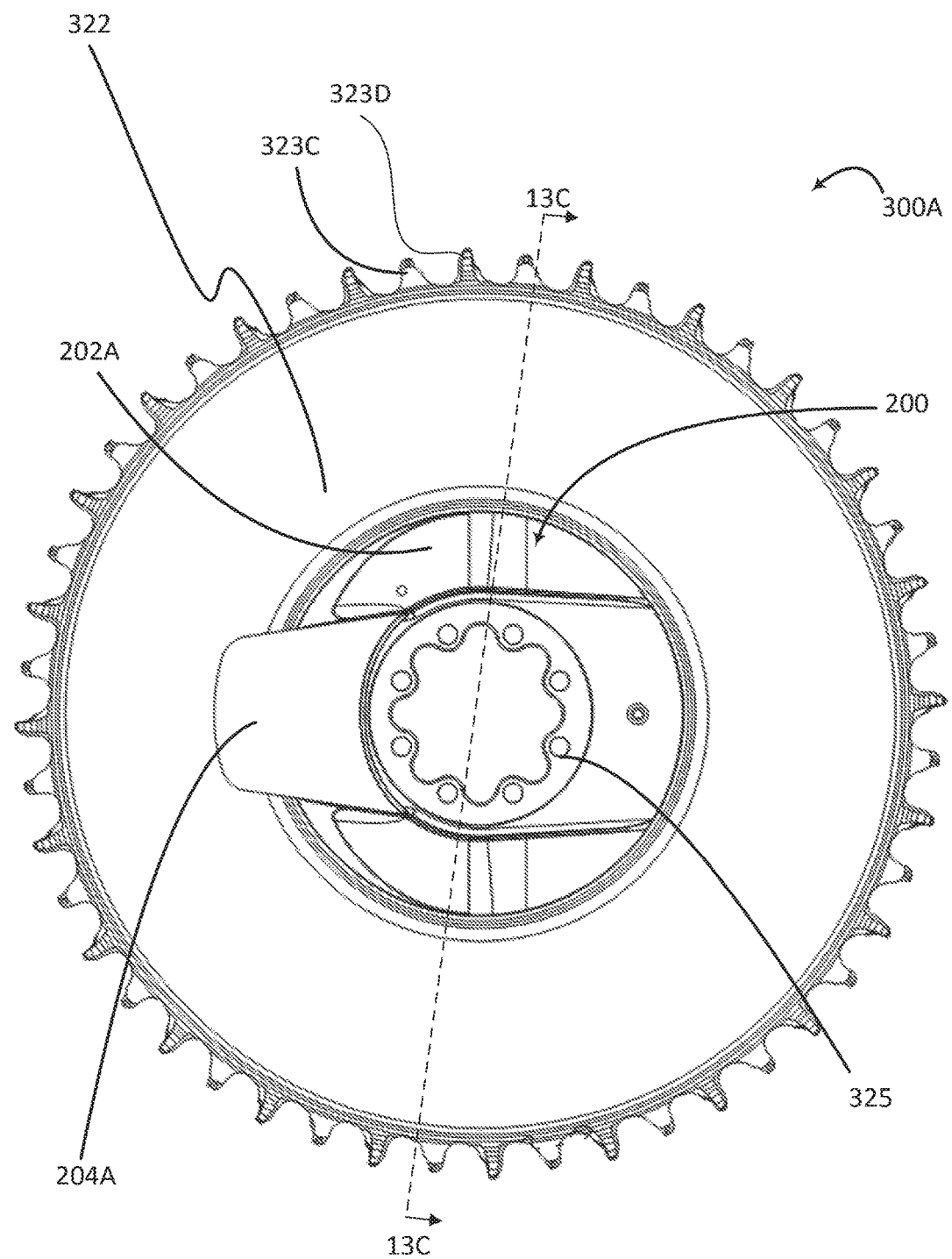
Figure 13C:
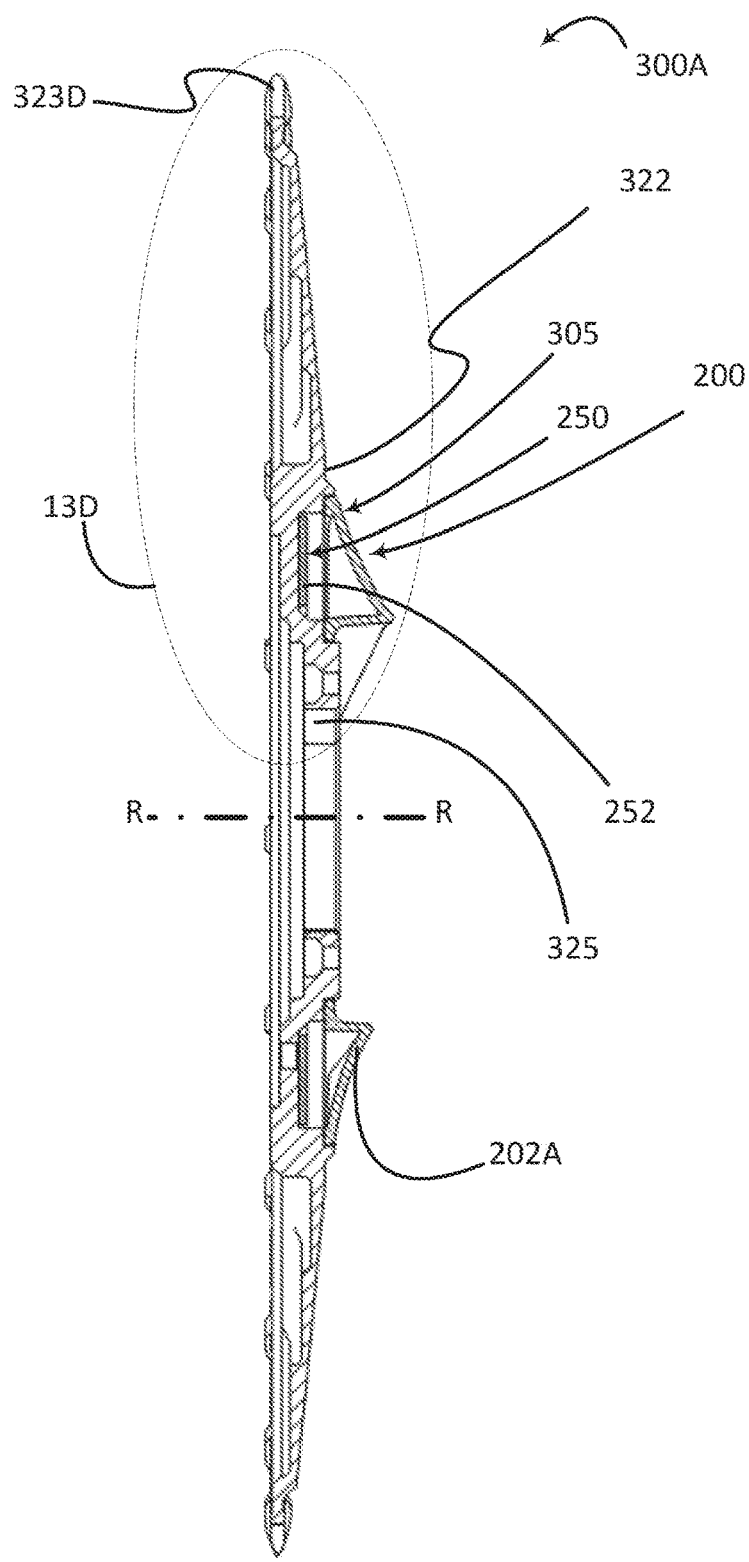
Figure 13D:
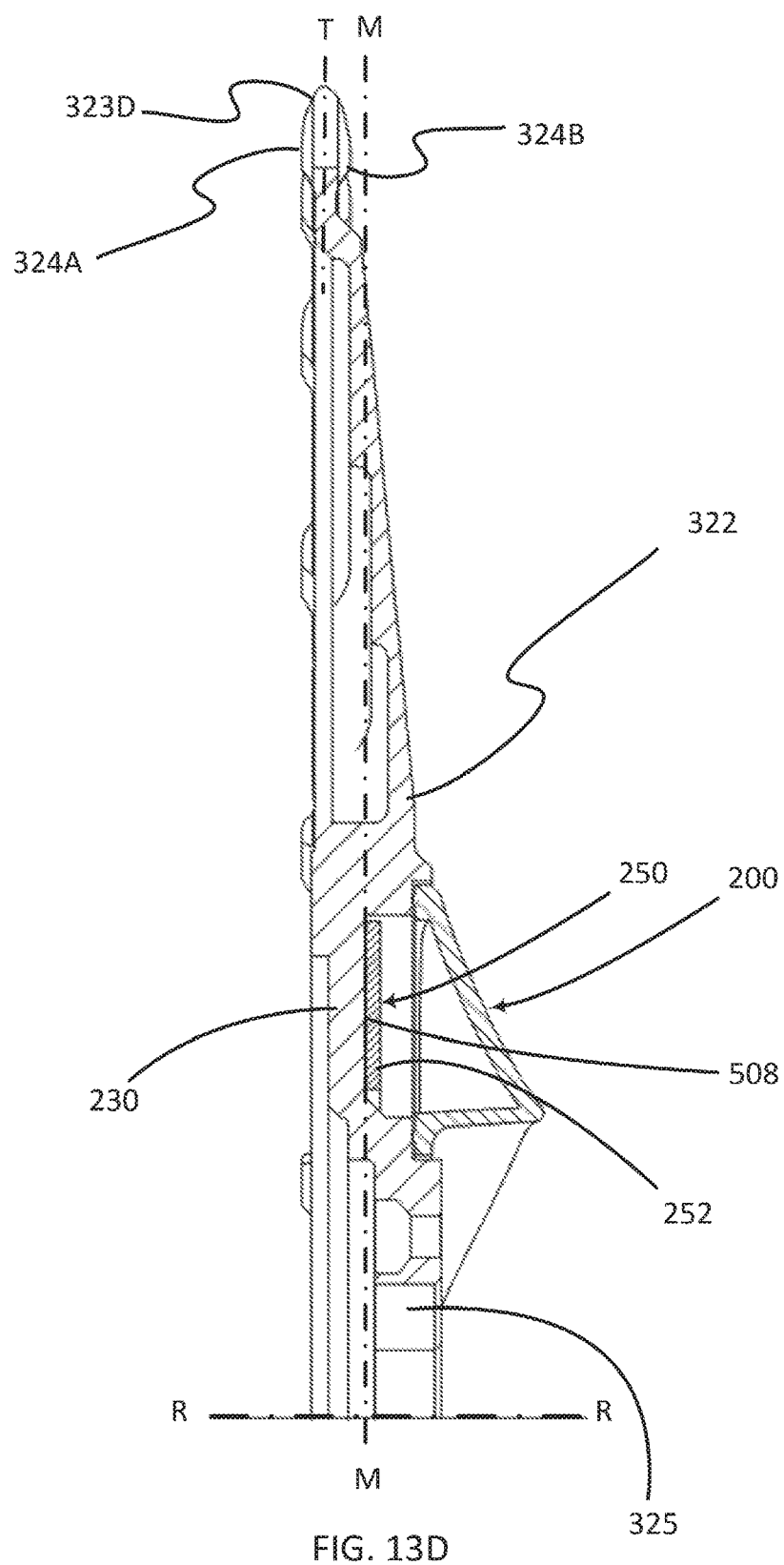

FIGS. 13A-13D show an embodiment having a power meter 200 integrated with a chainring structure 300A. FIG. 13C shows a cross sectional view of the power meter 200 integrated with the chainring structure 300A as is indicated in FIG. 13B. FIG. 13D shows an enlarged view of a portion of the power meter 200 integrated with the chainring structure 300A as indicated in FIG. 13C. The chainring structure 300A also includes a power meter cover 202A and/or a power supply cover 204A.

In the embodiment illustrated in FIGS. 13A-13D, the chainring structure 300A includes a first type of tooth 323C and a second type of tooth 323D. The second type of tooth 323D is configured to interact specifically with an outer link space and plates of a roller drive chain for a bicycle. The first type of tooth 323C is configured to interact specifically with an inner link space and plates of a roller drive chain for a bicycle. In an embodiment, as is illustrated in FIGS. 13A-13D, the second type of tooth 323D is axially wider than the first type of tooth 323C. For example, the second type of tooth 323D may include axial protrusions 324A, 324B configured to fill the outer link space and/or interact with outer link plates of a roller drive chain for a bicycle. There may be an inboard protrusion 324A and/or an outboard protrusion 324B on the second type of tooth 323D. In an embodiment, the first type of tooth 232C is free of protrusions on the outboard and inboard sides, while the second type of tooth includes protrusions on the outboard 324B and/or inboard side 324A. The outboard protrusion 324B and the inboard protrusion 324A may provide the same or different axial widths from a tooth centerline.

In an embodiment, as is illustrated in FIGS. 13A-13D, the chainring structure 300A includes a torque output section 322 comprising a plurality of teeth 323C, 323D configured as a sprocket 501, for example, a power output sprocket for the chainring structure 300A. The power meter 200 is integrated with the chainring structure 300A and disposed in a power meter chamber 506 formed in the chainring structure 300A. The chainring structure 300A also includes a torque input section 325 configured to attach to a crank assembly of a bicycle.

The chainring structure 300A includes the power meter chamber 506 disposed radially between the torque input section 325 and the torque output section 322, the power meter chamber 506 includes a base surface 508 of a strain measurement section 230. The power meter 200 has at least one strain measurement device attached to the base surface 508.

In the embodiment illustrated in FIGS. 13A-13D, the torque output section 322, torque input section 325, and power meter chamber 506 of the chainring structure 300A are formed as a unitary single piece and configured to dispose the base surface 508 axially outboard of the sprocket 501. For example, the base surface 508 may be disposed outboard of a center T of the plurality of one or both of the two different types of teeth 323C, 323D. In an embodiment, the base surface 508 may be disposed outboard of the outboard protrusion 324B of the second type of teeth 323D.

In this embodiment, the chainring structure 300A includes a PCB assembly installation section 305. The chainring structure also includes a torque input section 325, configured similarly to the torque input section 225 described above with regard to the chainring carrier 77. The chainring structure 300A also includes a torque output section 322 that includes a plurality of teeth 323C, 323D, as described above, configured to operationally interact with, and transmit torque to, a bicycle chain, such as the bicycle chain 72 described with respect to FIGS. 1A and 1B. The displayed embodiment also includes a PCB assembly 250, a power meter cover 202A and/or power supply cover 204A of the power meter 200.

Figure 14A:
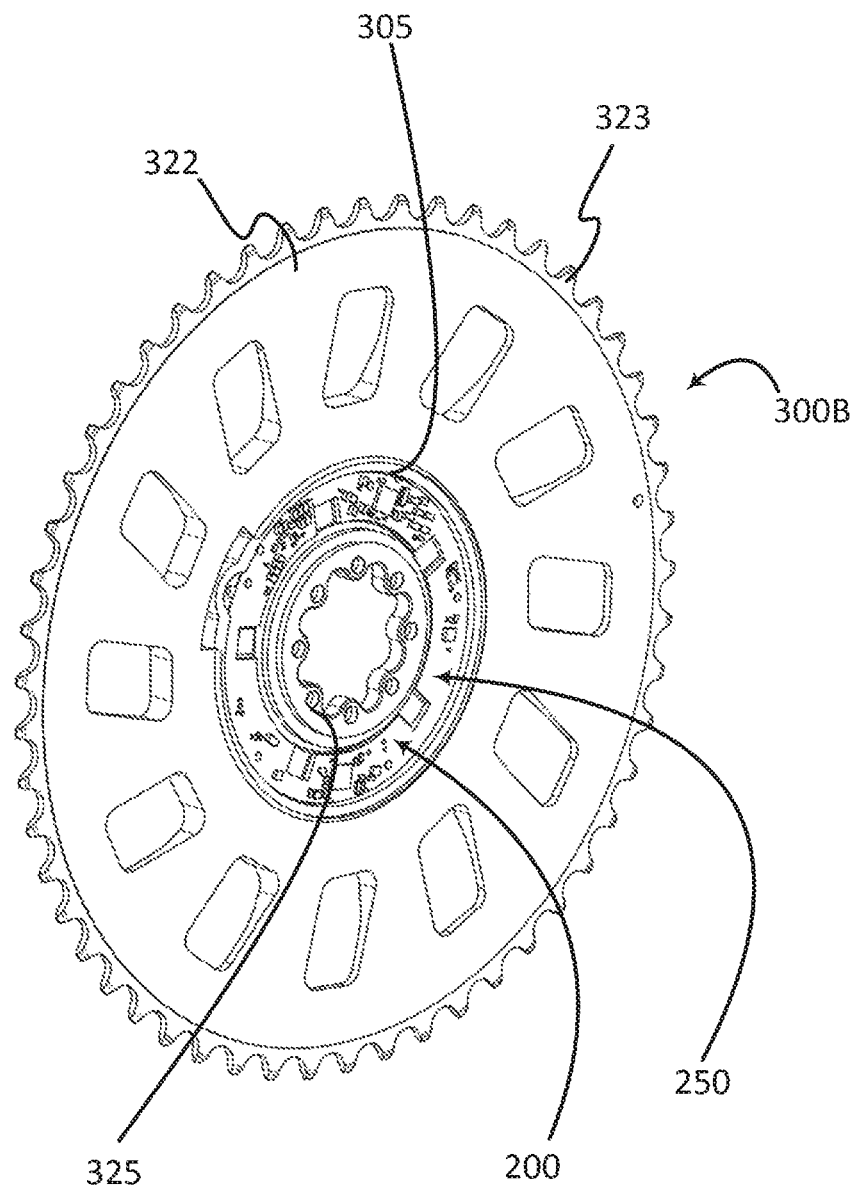
FIGS. 14A-14B illustrate various views of a power meter integrated with a chainring.
Figure 14B:
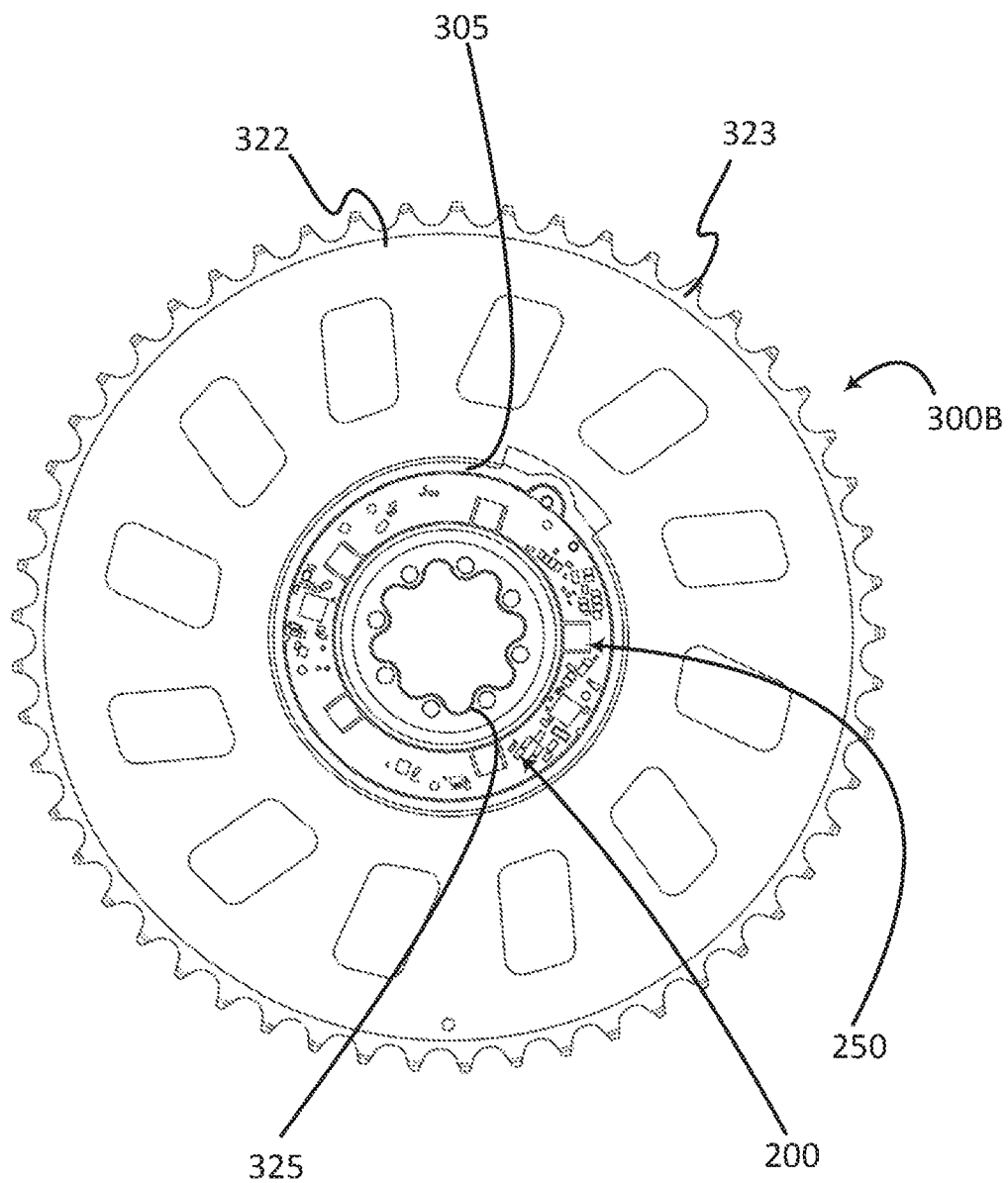
Figure 14C:
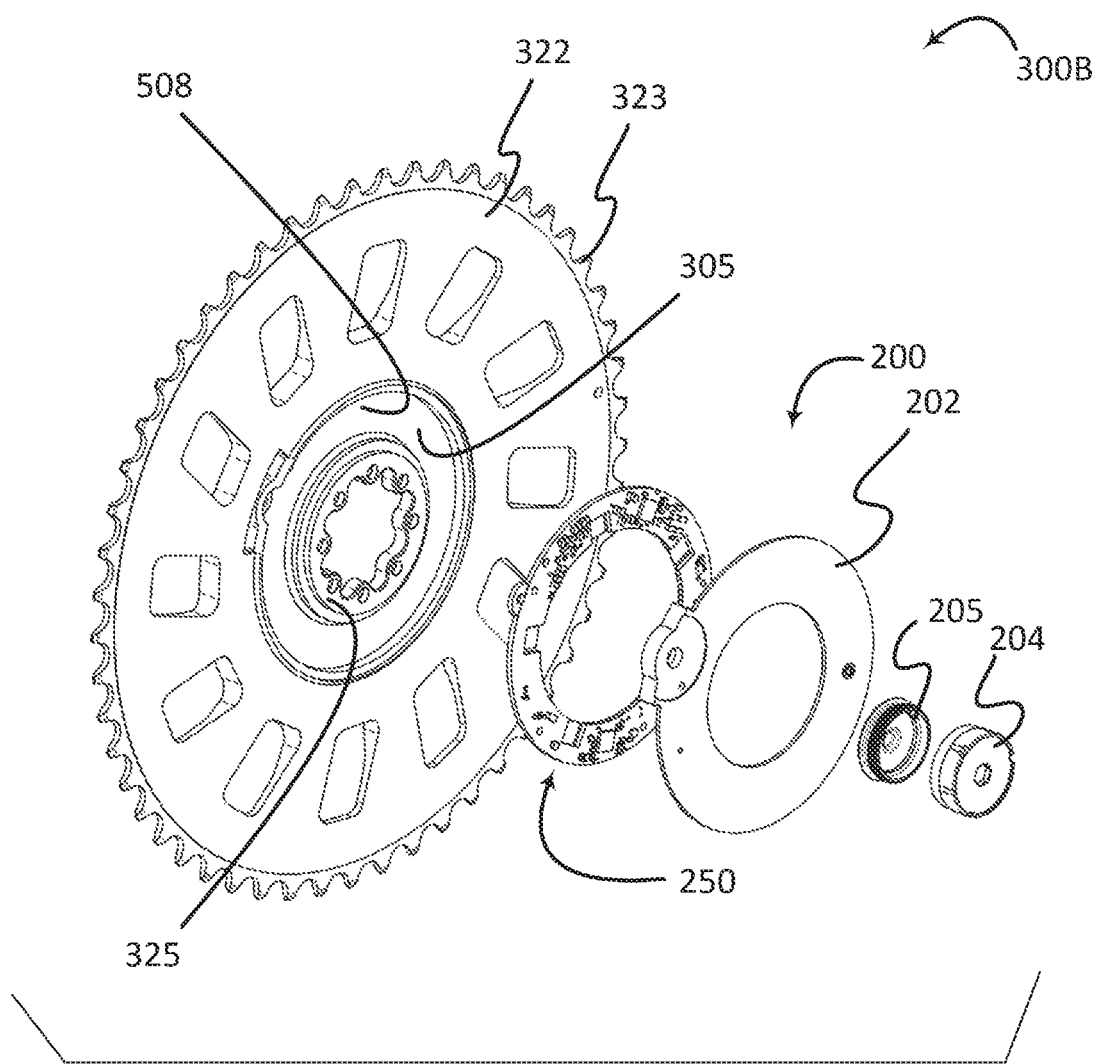
FIG. 14C illustrates an exploded view of the power meter integrated with the chainring of FIGS. 14A-14B.

FIGS. 14A and 14B show another embodiment having a power meter 200 integrated with a chainring structure 300B. FIG. 14C illustrates an exploded view of the chainring structure 300B, FIG. 14A shows a perspective view of the chainring structure 300B with the power meter cover 202 removed, and FIG. 14B shows a top view of the chainring 300B with the cover 202 removed.

In this embodiment, the chainring structure 300B includes a PCB assembly installation section 305. The chainring structure also includes a torque input section 325, configured similarly to the torque input section 225 described above with regard to the chainring carrier 77. The chainring structure 300B also includes a torque output section 322 that includes a plurality of teeth 323 configured to operationally interact with, and transmit torque to, a bicycle chain, such as the bicycle chain 72 described with respect to FIGS. 1A and 1B. The displayed embodiment also includes a PCB assembly 250, a power meter cover 202, and power supply components 204, 205 of the power meter 200.

FIGS. 15A-15E shows an embodiment similar to the embodiment shown in FIGS. 13A-13D and 14A-14C, but the torque output section 322 includes two pluralities of teeth 323A and 323B disposed as different drive sprockets for the drivetrain. The two pluralities of teeth 323A and 323B are formed as a small sprocket 502 and a large sprocket 504, the small sprocket having a smaller effective diameter and/or fewer teeth than the large sprocket.

In this embodiment, the chainring structure 300C includes a torque output section 322 comprising a plurality of sprockets having two axially bounding sprockets 502, 504 defining an inner-most 502 and outer-most sprocket 504. The power meter 200 is integrated with the chainring structure 300C and disposed in a power meter chamber 506. The chainring structure 300C also includes a torque input section 325 configured to attach to a crank assembly.

The chainring structure 300C includes a power meter chamber 506 disposed radially between the torque input 325 section and the torque output section 322, the power meter chamber 506 including a base surface 508 of a strain measurement section 230. A power meter 200 is disposed in the power meter chamber 506. The power meter 200 has at least one strain measurement device attached to the base surface 508. The torque output section 322, torque input section 325, and power meter chamber 506 of the chainring structure 300C are formed as a unitary single piece and configured to dispose the base surface 508 axially between the axially bounding sprockets 502, 504 of the plurality of sprockets. The base surface 508 may be disposed between centers A1, A2 of the sprockets and/or the two pluralities of teeth 323A, 323B. In an embodiment, the base surface 508 may be axially disposed in a space bounded by an inboard surface 524 of teeth 323A of a larger sprocket 504 and an outboard surface 522 of teeth 323B of a smaller sprocket 502.

Figure 15A:
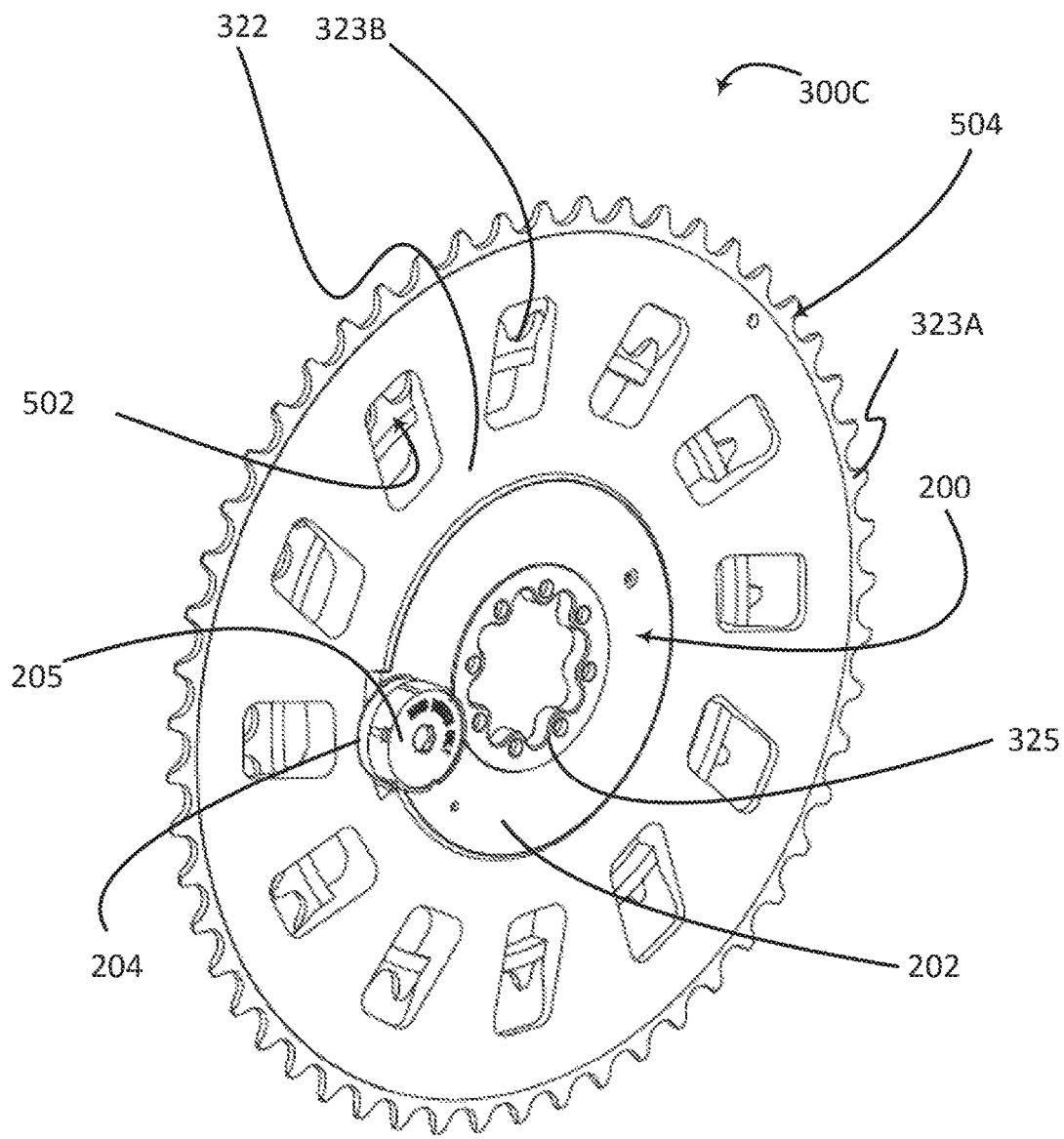
FIG. 15A illustrates a perspective view of the power meter integrated with multiple drive sprockets.
Figure 15B:
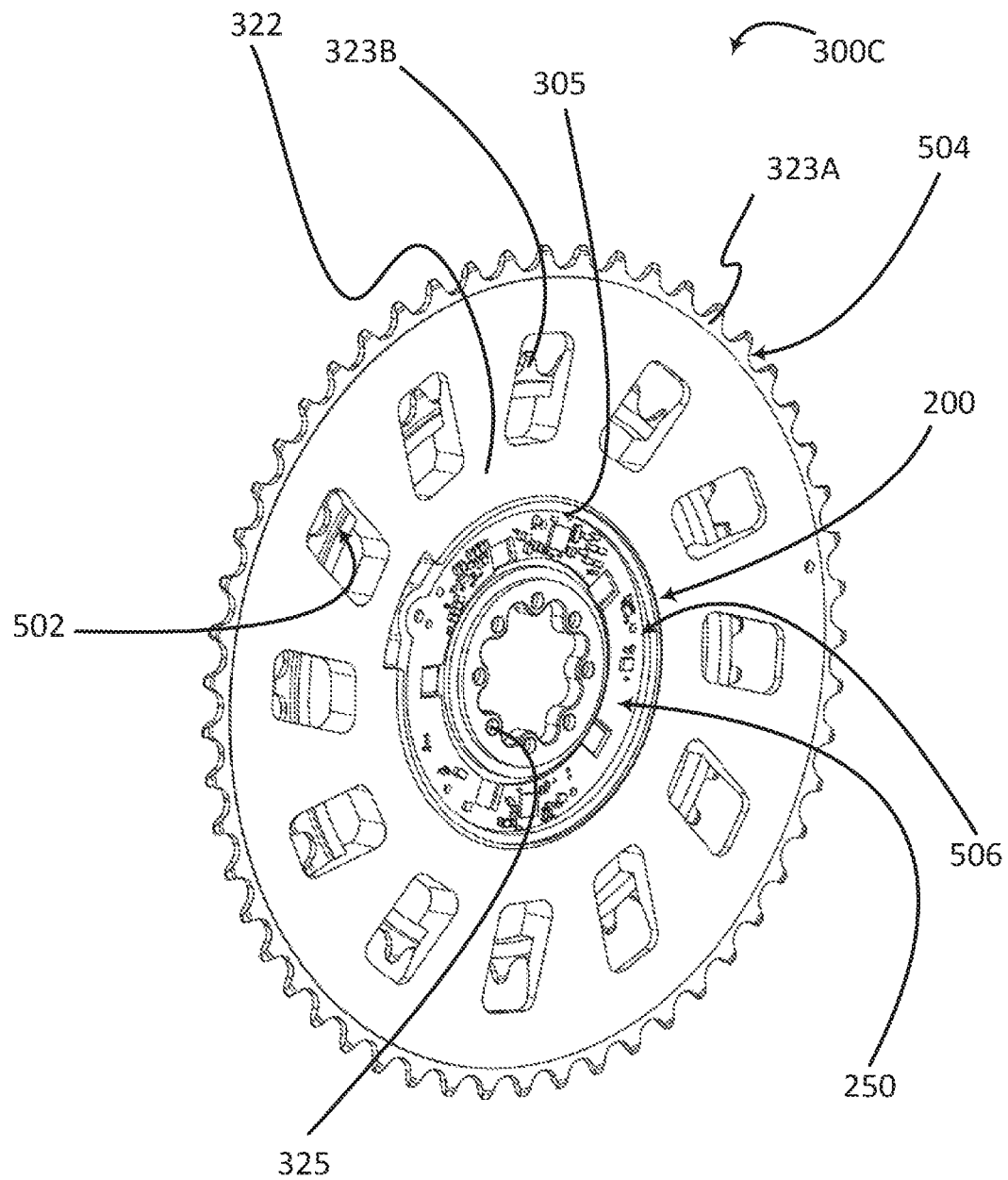
FIG. 15B illustrates the power meter integrated with multiple drive sprockets of FIG. 15A with the power meter cover removed to show the printed circuit board assembly and power meter chamber.
Figure 15C:
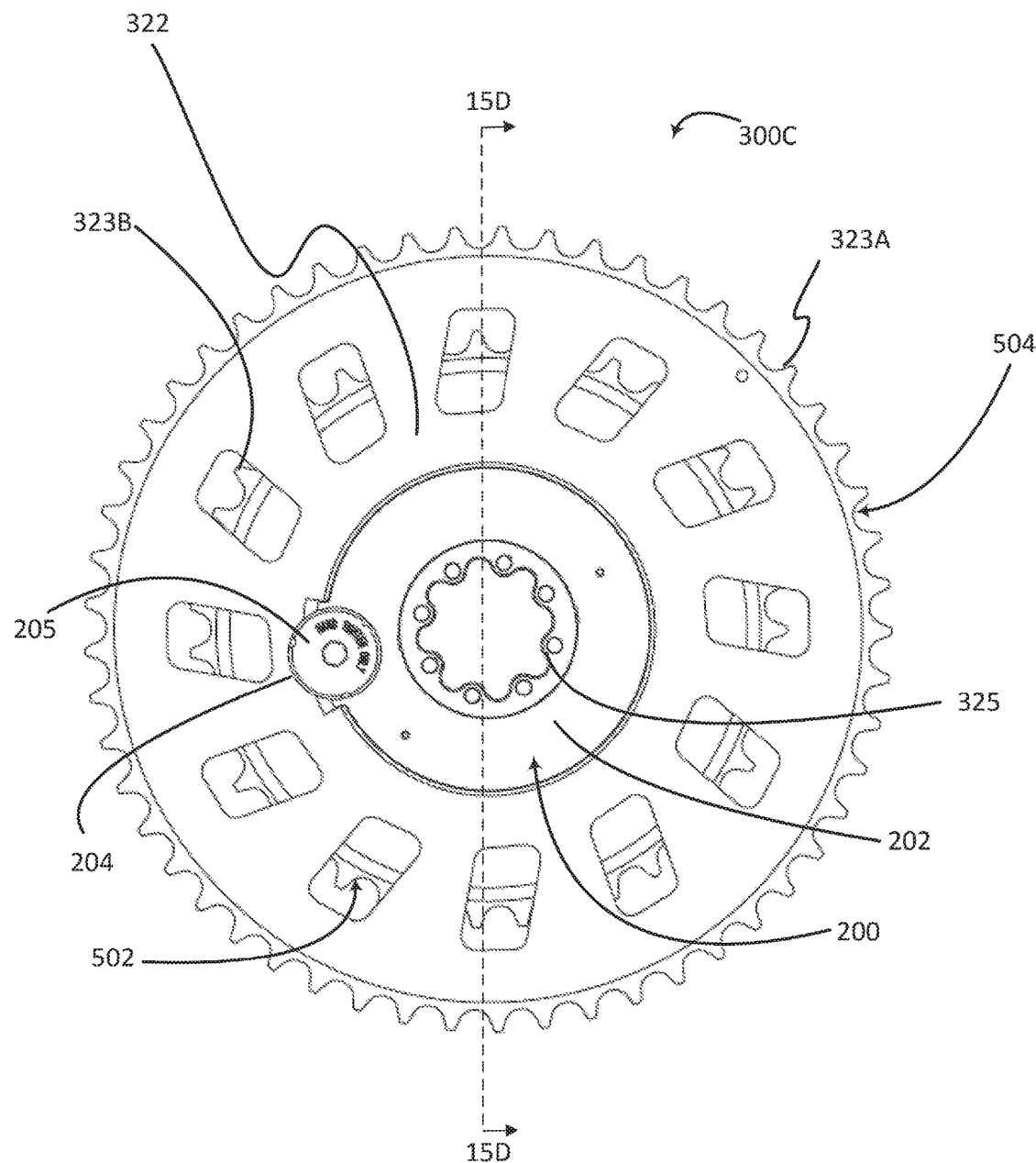
FIGS. 15C-15E illustrate various view of the power meter integrated with multiple drive sprockets of FIG. 15A.
Figure 15D:
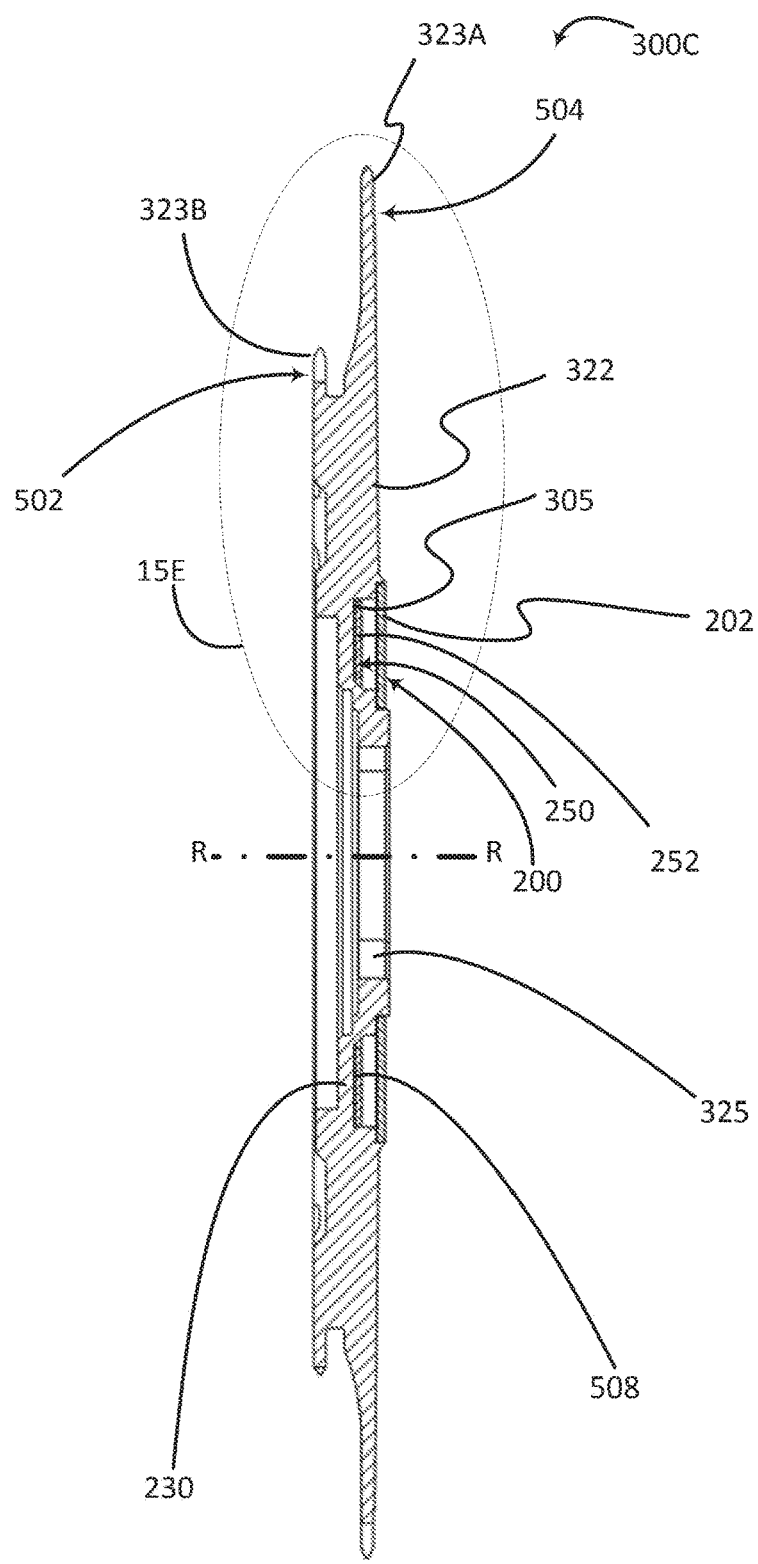
Figure 15E:
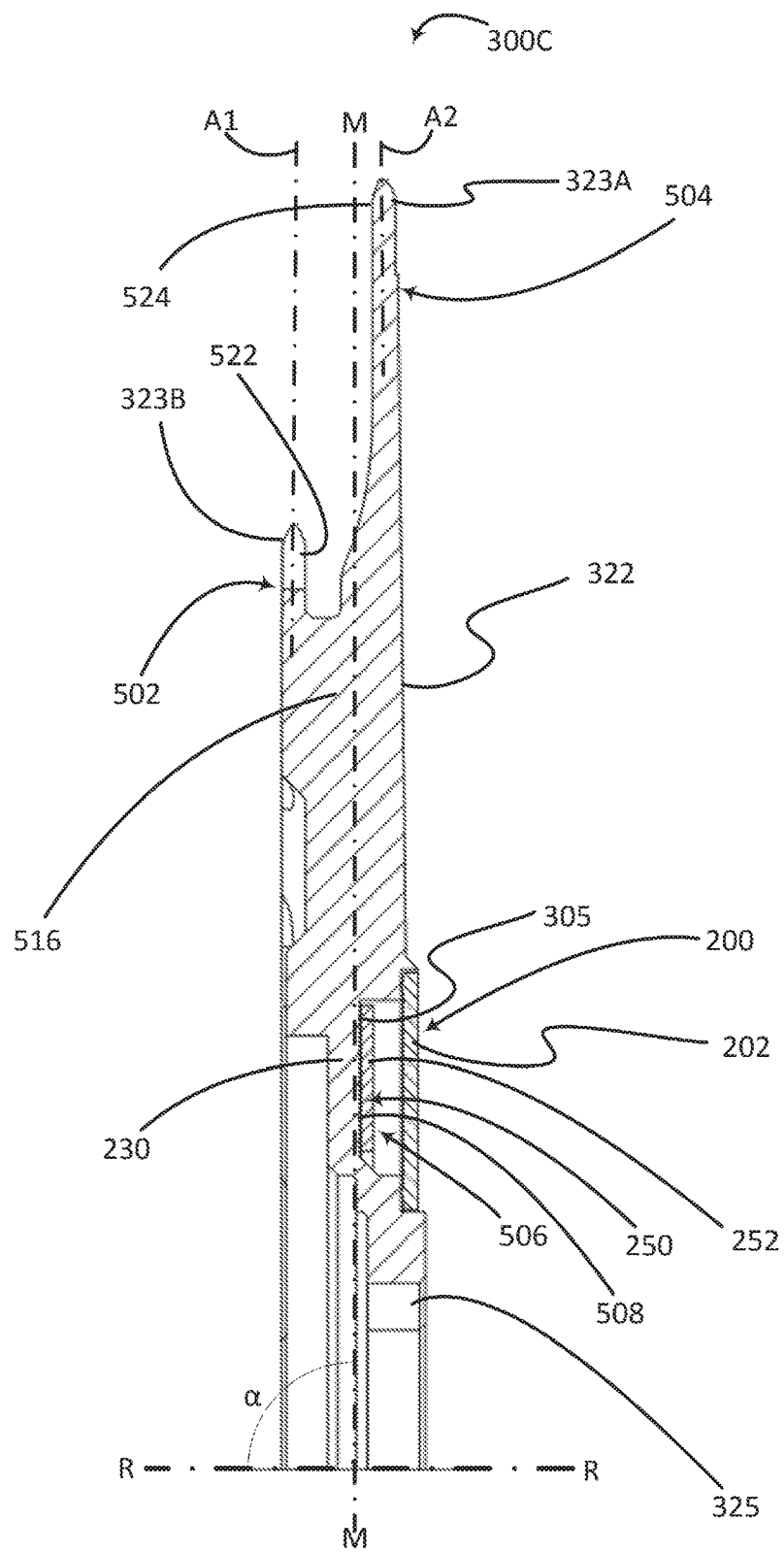

In an embodiment, the power meter chamber 506 is formed so as to dispose a plane M that includes the base surface 508, at an angle α to an axis of rotation R of the plurality of sprockets. For example, as is shown in FIG. 15E, the power meter chamber 506 is formed as a unitary single piece so as to dispose a plane M perpendicular to an axis of rotation R of the plurality of sprockets. The plane M includes the base surface 508 and is between the bounding sprockets 502, 504.

As is illustrated in the embodiment illustrated in FIG. 15E, the torque output section 322, torque input section 325, and power meter chamber 506 are formed from a same material. For example, the torque output section 322, torque input section 325, and power meter chamber 506 may be formed from aluminum or an aluminum alloy. Other materials such as steal may also be used.

In an embodiment the torque output section 322, torque input section 325, and/or power meter chamber 506 are formed through a removal of material from a single piece of a same or common material. For example, the torque output section 322, torque input section 325, and power meter chamber 506 may be formed through a machining and/or milling process. In an embodiment, the base surface 508 is formed through the removal of material from the single piece to expose the base surface 508. In an embodiment, there is a transition section 516 also formed between and connecting the first sprocket 502 and the second sprocket 504. The transition section may be formed of the same single piece material as the the first sprocket 502 and the second sprocket 504. In an embodiment, the teeth of the first sprocket 502 and/or the second sprocket 504 are also formed of the same single piece material, for example through material removal techniques such as machining or milling. Other techniques may also be used to form the single piece material into the chainring structure. For example, stamping, forging and/or other forming techniques may be used. Similarly, in an embodiment the single sprocket chainring structure 300A, as illustrated in the embodiments shown in FIGS. 13A-13D and 14A-14C, may also be formed as a single piece unitary structure, for example from a single piece of material through material removal or other processes.

In an embodiment the strain measurement section 230 includes at least one strain measurement feature formed in the one piece unitary structure of the chainring structure 300C. The at least one strain measurement feature may include the base surface 508. At least one strain measurement device may be attached to the strain measurement feature at the base surface 508. The strain measurement device may be attached to the base surface 508 using an adhesive, for example as is described herein.

In an embodiment, the power meter comprises a printed circuit board ("PCB") having a substrate 252, and the substrate 252 is of annular construction and disposed in the power meter chamber 506 around the torque input section 325 of the chainring structure 300C. The at least one strain measurement device may be a plurality of strain measurement devices disposed about the torque input section 325 of the chainring structure 300C.

Figure 16A:
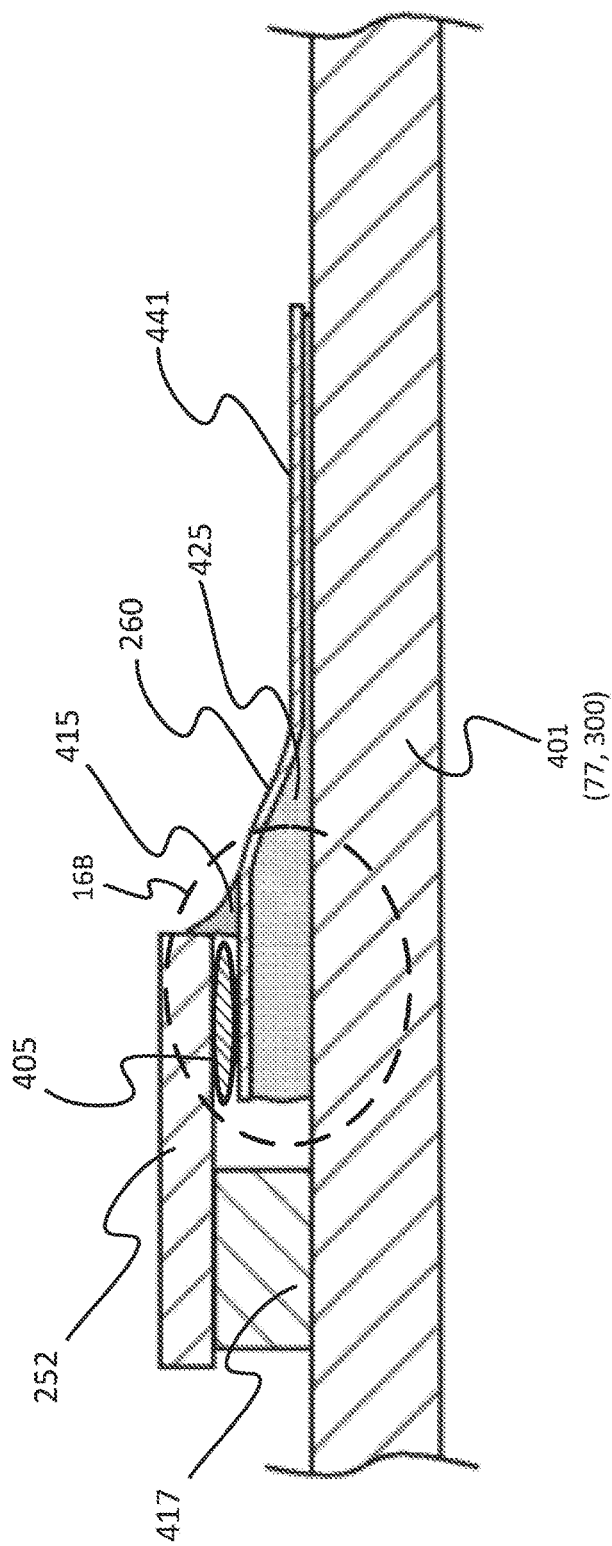
FIG. 16A shows an expanded view of the cross section indicated in FIG. 8.
Figure 16B:
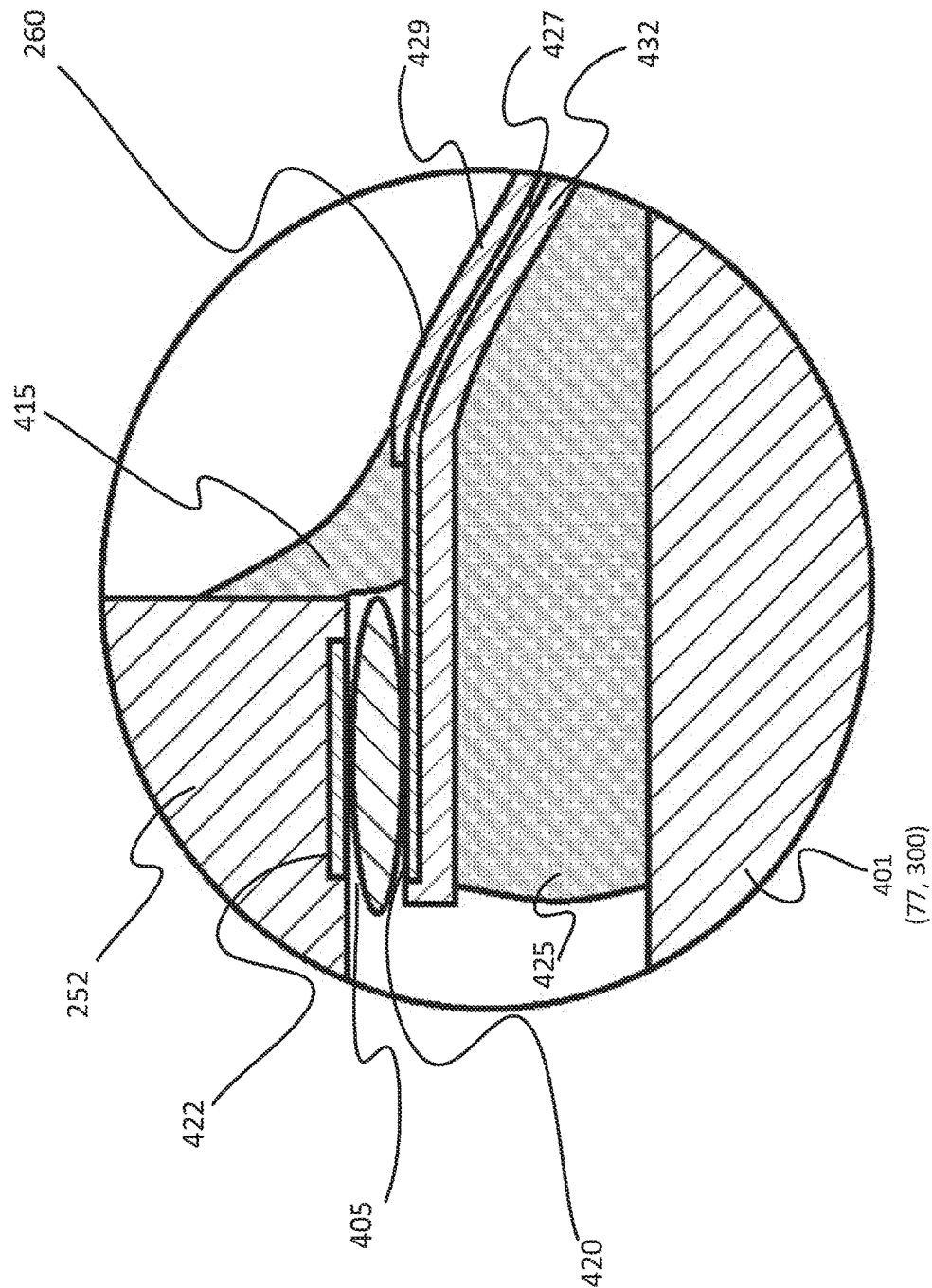
FIG. 16B shows an expanded view of the area indicated in FIG. 16A.

FIGS. 16A and 16B illustrate close up views of the attachment of the strain measurement devices 260 to the substrate 252 of the PCB and the body 401. A volume of electrically conductive bonding material 405, for example a fusible metal alloy such as tin, lead, brass, or silver based solder, is disposed between planar electrical contact surfaces 420 of the strain measurement device 260 and electrical circuitry contacts 422 that are communicatively coupled to circuitry 28 of the PCB assembly. The volume of electrically conductive bonding material 405 involves at least one distinct volume of electrically conductive bonding material, and the electrical circuitry contacts 422, and/or the substrate 252, and the at least one strain measurement device 260 are in physical contact with the distinct volume of electrically conductive bonding material 405. The electrical circuitry contacts 422 may be embedded in the substrate 252.

The strain measurement device 260 may be laminar, and formed of multiple layers. A base layer 432 may be formed to provide an attachment surface to be attached to the body 401 and a base insulative layer for conductive material 427 of the strain measurement patterns and/or the electrical contact surfaces 420 of the strain measurement device 260. A cover layer 429 may be included to cover the conductive material 427 layer. The cover layer 429 may not exist in an area of the electrical contact surfaces 420 so as to leave the contact surfaces available for electrical connection. The strain measurement patterns are disposed in a section 441 to be attached to the body 401. In the displayed embodiment, the section 441 is to be disposed generally flat and parallel to the correlating surface of the body 401.

The strain measurement device 260 is attached to the body 401 with an attachment material 425 that is appropriately rigid to transmit the deformation of the body in a measurable way to the strain measurement device 260, but also resilient enough to avoid cracking or otherwise breaking down due to repetitive deformation of the body. In an embodiment an adhesive, such as a cyanoacrylate based adhesive, is used. Polyester, Phenol, and/or epoxy based adhesives may also be used.

The PCB assembly and/or the substrate may be attached to the body using any technique. In the displayed embodiment, a material 417 such as a double sided adhesive tape, for example a foam adhesive tape, may be used to secure the PCB assembly to the body 401. Such attachment may provide for thermal and mechanical deformations of the body 401 to be isolated from the PCB assembly. Such attachment mechanisms, however, may cause the substrate 252 to which the strain measurement device 260 is attached, to have a significant void to be filled between the strain measurement device 260 and the body 401. This void may be filled with the strain measurement device attachment material 425, however, the configuration may apply stresses to the strain measurement device 260 that can cause buckling or other breakages of the conductive material layer of the strain measurement device 260.

To help alleviate this configuration issue, the strain measurement device 260 may also be attached to the substrate 252 of the PCB assembly with a structural support material 415. The structural support material 415 is configured to provide structural rigidity to the strain measurement device 260 as the device is deformed to form a connection with the body 401. A structural support fillet or other structure may be formed by the structural support material 415. The structural support material 415 may be disposed so as to be connected to the substrate 252 and the cover layer 429 of the strain measurement device 260. In an embodiment, the structural support material 415 maintains an edge of the substrate and at least a portion of the strain measurement device 260 in a generally orthogonal or perpendicular orientation. The structural support material 415 may be any material operable to provide the requisite rigidity. For example, an ultra-violet light curable adhesive may be used.

Figure 17:
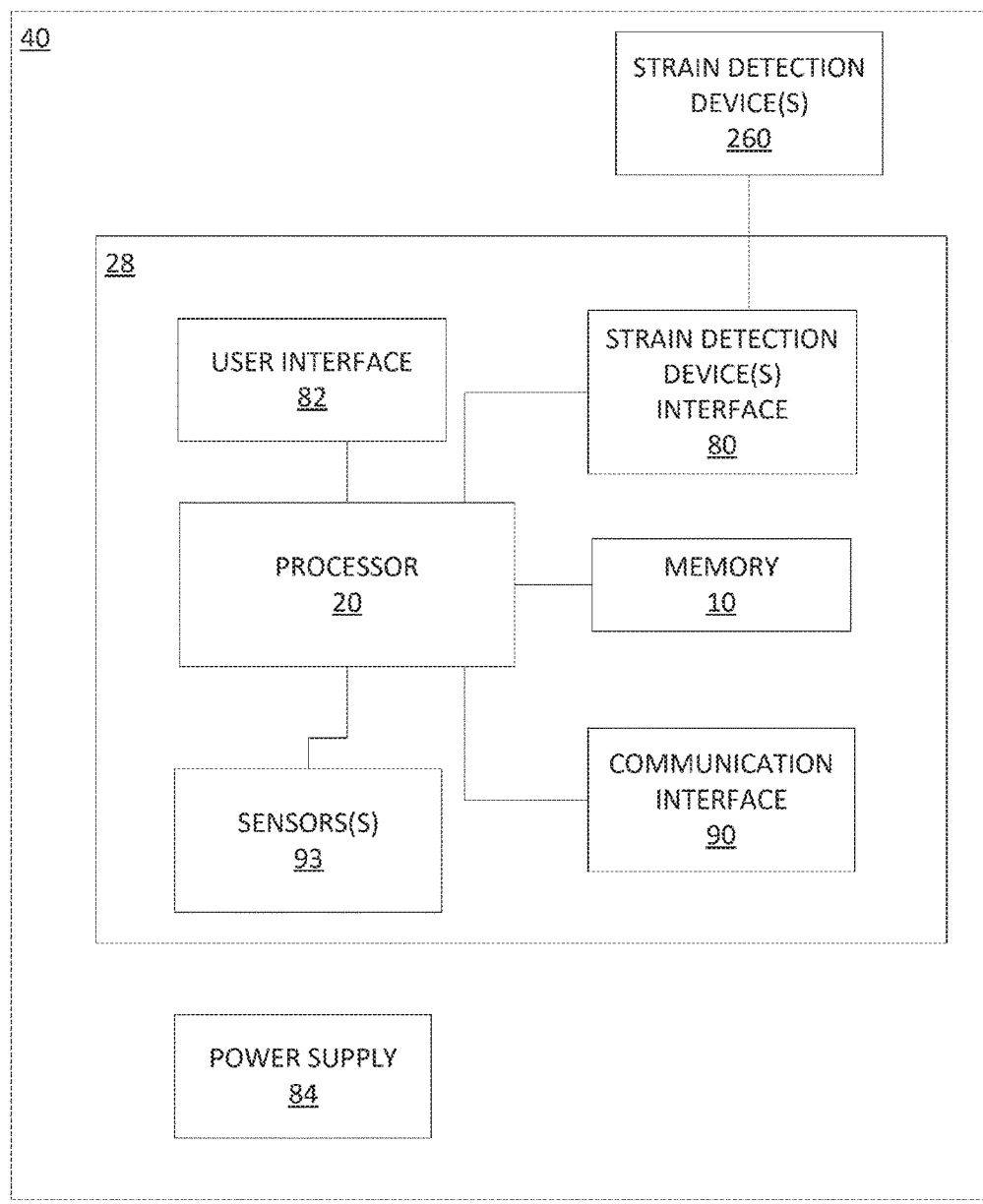
FIG. 17 is a block diagram of an embodiment of a power meter system.

FIG. 17 is a block diagram of an exemplary power meter system 40 for a bicycle. The system 40 may be used alone to communicate with and/or control bicycle components or other devices. The system 40 includes circuitry 28 which includes at least one processor 20 and a memory 10. In the illustrated embodiment, the circuitry 28 also includes a user interface 82, a strain detection device interface 80, and a communication interface 90. Circuitry 28 may also include component connections and/or electrically connecting materials embedded in a substrate material. The system also includes at least one strain detection device 260 in communication with the strain detection device communication interface 80. Additional, different, or fewer components are possible for the power meter system 40. For example, the user interface 82 may not be included in a circuitry 28 and/or the power meter system. Also, components may be combined. In an embodiment, the power meter system is integrated with a component of a power train of a bicycle, such as a chainring or chainring carrier, for example as is described with respect to FIGS. 2-16.

The processor 20 may include a general processor, digital signal processor, an application specific integrated circuit (ASIC), field programmable gate array (FPGA), analog circuit, digital circuit, combinations thereof, or other now known or later developed processor. The processor 20 may be a single device or combinations of devices, such as through shared or parallel processing.

The circuitry 28 is operable to interpret a signal indicative of strain from deformation of an attached body from one or more of the strain detection devices 260 and determine a corresponding power transmitted between the torque input and the torque output section. For example, the signal may be communicated from the strain detection devices 260 to the processor 20 which may apply a conversion technique of the strain to a power transmitted across the body for a time period. Such a conversion technique may involve using the known material characteristics of the body, such as the modulus of elasticity and a known geometry of the body. Force values to cause amounts of strain measurable by the strain detection devices 260 may be known from these, or other, characteristics of the power meter system. For example, these values, or indications of these values, may be stored on a memory 10. The measured strain values may be matched against these values by the processor 20 to determine an input force, and a resulting power over time transmitted by the body of the drive train.

The memory 10 may be a volatile memory or a non-volatile memory. The memory 10 may include one or more of a read only memory (ROM), random access memory (RAM), a flash memory, an electronic erasable program read only memory (EEPROM), or other type of memory. The memory 10 may be removable from the power meter system 40, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 10 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 84 may include a combination of multiple batteries or other power providing devices. Specially fitted or configured battery types, or standard battery types such as CR 2012, CR 2016, and/or CR 2032 may be used.

The communication interface 90 provides for data and/or signal communication from the power meter system 40 to another component of the bicycle, or an external device such as a mobile phone or other computing device. The communication interface 90 communicates the data using any operable connection. An operable connection may be one in which signals, physical communications, and/or logical communications may be sent and/or received. An operable connection may include a physical interface, an electrical interface, and/or a data interface. The communication interface 90 may be configured to communicate wirelessly, and as such include one or more antennae. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the communication interface 90 may be configured to transmit a signal indicative of a power determined from a measured strain of a body. Further, the determined power may be transmitted wirelessly.

The strain detection device interface 80 provides for data and/or signal communication from one or more strain detection devices 260 to the power meter circuitry 28. The interface 80 communicates using wired and/or wireless communication techniques. For example, the interface 80 communicates with the strain detection devices 260 using a system bus, or other communication technique. The strain detection device interface 80 may include additional electric and/or electronic components, such as an additional processor and/or memory for detecting, communicating, and/or otherwise processing signals of the strain detection devices 260.

The user interface 82 may be one or more buttons, keypad, keyboard, mouse, stylus pen, trackball, rocker switch, touch pad, voice recognition circuit, or other device or component for communicating data between a user and the power meter system 40. The user interface 82 may be a touch screen, which may be capacitive or resistive. The user interface 82 may include a liquid crystal display ("LCD") panel, light emitting diode ("LED"), LED screen, thin film transistor screen, or another type of display. The user interface 82 may also include audio capabilities, or speakers.

In an embodiment, the user interface 82 includes an LED indicator. The LED indicator lights to indicate input of the commands or other actions of the power meter system.

The communication interface 90 is configured to send and/or receive data such as control signals and/or commands to and/or from bicycle components such as the front gear changer 30 and/or the shift units 26. The component communication interface 90 communicates the data using any operable connection. An operable connection may be one in which signals, physical communications, and/or logical communications may be sent and/or received. An operable connection may include a physical interface, an electrical interface, and/or a data interface. The communication interface 90 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as the circuitry 28. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a power meter system 40 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

In an embodiment, a power meter for a bicycle includes a body comprising a torque input section and a torque output section, the body configured to transmit power between the torque input section and the torque output section. The power meter also includes a printed circuit board ("PCB"). The PCB includes a substrate, at least one strain measurement device attached to the substrate, the at least one strain measurement device configured to provide a signal indicative of strain detected in the body, and circuitry, embedded in the substrate, the circuitry configured for interpreting the signal and determining a corresponding power transmitted between the torque input and the torque output section. In an embodiment, the at least one strain measurement device may be attached to the substrate such that the at least one strain measurement device is fixed in a plane of the PCB relative to at least one feature of the PCB. In an embodiment, the feature is formed in the substrate. In an embodiment, the at least one strain measurement device may be a foil or wire type electrical strain gauge. In an embodiment, the torque output section may include teeth. In an embodiment, the torque output section may include chainring attachment features. In an embodiment, the at least one strain measurement device may include planar electrical contact surfaces, and the PCB may be configured such that the strain measurement device planar electrical contact surfaces are disposed facing electrical circuitry contacts of the PCB, the electrical circuitry contacts of the PCB communicatively coupled to both the strain measurement device planar electrical contact surfaces and the circuitry of the PCB. In an embodiment, the at least one strain measurement device may be communicatively coupled to the circuitry of the PCB with a volume of an electrically conductive bonding material. In an embodiment, the electrically conductive bonding material may be a fusible metal alloy. In an embodiment, the volume of electrically conductive bonding material may include at least one distinct volume of electrically conductive bonding material, and both the PCB and the at least one strain measurement device are in physical contact with the distinct volume of electrically conductive bonding material. In an embodiment, the at least one strain measurement device may be attached to the body with an adhesive. In an embodiment, the at least one strain measurement device attachment to the PCB may include a structural support material. In an embodiment, the structural support material may be disposed both on an edge of the substrate and on a surface of the at least one strain measurement device. In an embodiment, the edge and the surface are oriented substantially orthogonal to each other. In an embodiment, the substrate may be of annular construction and disposed in the body around the torque input section. In an embodiment, the at least one strain measurement device may include a plurality of strain measurement devices disposed about the torque input section. In an embodiment, the plurality of strain measurement devices may be disposed so as to align with strain measurement features of the body. In an embodiment, the substrate includes at least one strain measurement device attachment feature, and the at least one strain measurement device may be disposed on the substrate so as to be aligned with the at least one strain measurement device attachment feature. In an embodiment, the strain measurement device attachment feature may include at least one vacancy formed in the substrate. In an embodiment, the vacancies are configured to provide access to the at least one strain measurement device in an axial direction of the PCB. In an embodiment, the body further may include bolt holes in the torque output section configured for attachment to a chainring, and the strain measurement device attachment features are disposed so as to correlate to the bolt holes. In an embodiment, the power meter may include a same number of strain measurement features and bolt holes. In an embodiment, the circuitry may be further configured to wirelessly transmit a second signal indicative of the determined power.

In an embodiment a brake rotor includes a rotor carrier having a torque input section, and a torque output section. The brake rotor also includes a printed circuit board ("PCB") that includes a substrate, at least one strain measurement device, the at least one strain measurement device configured to provide a signal indicative of strain detected in the rotor carrier, and circuitry, attached to the substrate, the circuitry configured for interpreting the signal and determining a corresponding power transmitted between the torque input and the torque output section. The brake rotor also includes an annular rotor structure attached to the torque output section of the rotor carrier and having at least one friction surface configured for generating friction to dissipate power provided at the torque input section of the carrier. The carrier may also include heat dissipation features.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A chainring structure, comprising:
    a torque output section comprising a plurality of sprockets having two axially bounding sprockets defining an inner-most and outer-most sprocket;
    a torque input section configured to attach to a crank assembly;
    a power meter chamber disposed radially between the torque input section and the torque output section, the power meter chamber including a base surface of a strain measurement section;
    a power meter disposed in the power meter chamber and having at least one strain measurement device attached to the base surface;
    the torque output section, torque input section, and power meter chamber formed as a unitary single piece and configured to dispose the base surface axially between the axially bounding sprockets of the plurality of sprockets.

2. The chainring structure of claim 1, wherein the power meter chamber is formed as a unitary single piece so as to dispose a plane perpendicular to an axis of rotation of the plurality of sprockets and including the base surface between the bounding sprockets.

3. The chainring structure of claim 1, wherein the torque output section, torque input section, and power meter chamber are formed from a same material.

4. The chainring structure of claim 3, wherein the same material is aluminum or an aluminum alloy.

5. The chainring structure of claim 3, wherein the torque output section, torque input section, and power meter chamber are formed through a removal of material from a single piece of the same material.

6. The chainring structure of claim 5, wherein the base surface is formed through the removal of the same material from the single piece to expose the base surface.

7. The chainring structure of claim 1, wherein the strain measurement section comprises at least one strain measurement feature.

8. The chainring structure of claim 1, wherein the at least one strain measurement device comprises planar electrical contact surfaces, and the power meter comprises a printed circuit board ("PCB"), the PCB being configured such that strain measurement device planar electrical contact surfaces are disposed facing electrical circuitry contacts of the PCB, the electrical circuitry contacts of the PCB communicatively coupled to both the strain measurement device planar electrical contact surfaces and the circuitry of the PCB.

9. The chainring structure of claim 8, wherein the at least one strain measurement device attachment to the PCB comprises a structural support material.

10. The chainring structure of claim 1, wherein the at least one strain measurement device is a foil or wire type electrical strain gauge.

11. The chainring structure of claim 1, wherein the at least one strain measurement device is communicatively coupled to the circuitry of a printed circuit board ("PCB") of the power meter with a volume of an electrically conductive bonding material.

12. The chainring structure of claim 11, wherein the electrically conductive bonding material is a fusible metal alloy.

13. The chainring structure of claim 11, wherein the volume of electrically conductive bonding material comprises at least one distinct volume of electrically conductive bonding material, and both the PCB and the at least one strain measurement device are in physical contact with the distinct volume of electrically conductive bonding material.

14. The chainring structure of claim 1, wherein the at least one strain measurement device is attached to the base surface with an adhesive.

15. The chainring structure of claim 1, wherein the power meter comprises a printed circuit board ("PCB") having a substrate, and the substrate is of annular construction and disposed in the power meter chamber around the torque input section.

16. The chainring structure of claim 15, wherein the at least one strain measurement device comprises a plurality of strain measurement devices disposed about the torque input section.

17. The chainring structure of claim 15, wherein the at least one strain measurement device is attached to the substrate.

\* \* \* \* \*